United States Patent
Ray et al.

(10) Patent No.: US 10,417,500 B2
(45) Date of Patent: Sep. 17, 2019

(54) SYSTEM AND METHOD FOR AUTOMATIC GENERATION OF SPORTS MEDIA HIGHLIGHTS

(71) Applicant: Disney Enterprises, Inc., Burbank, CA (US)

(72) Inventors: Abhik Ray, Burbank, CA (US); Joel Branch, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 15/857,142

(22) Filed: Dec. 28, 2017

(65) Prior Publication Data

US 2019/0205652 A1     Jul. 4, 2019

(51) Int. Cl.
*G06K 9/00* (2006.01)

(52) U.S. Cl.
CPC ..... *G06K 9/00751* (2013.01); *G06K 9/00724* (2013.01); *G06K 2009/00738* (2013.01)

(58) Field of Classification Search
None
See application file for complete search history.

(56) References Cited

U.S. PATENT DOCUMENTS

| | | |
|---|---|---|
| 5,729,471 A | 3/1998 | Jain et al. |
| 5,860,862 A | 1/1999 | Junkin |
| 5,993,314 A | 11/1999 | Dannenberg et al. |
| 6,151,571 A | 11/2000 | Pertrushin |
| 6,976,031 B1 | 12/2005 | Toupal et al. |
| 7,667,596 B2 | 2/2010 | Ozdemir et al. |
| 7,865,887 B2 | 1/2011 | Kaiser et al. |
| 7,899,611 B2 | 3/2011 | Downs et al. |
| 8,073,190 B2 | 12/2011 | Gloudemans et al. |
| 8,224,766 B2 | 7/2012 | Skibiski et al. |
| 8,391,825 B2 | 3/2013 | Arsenau et al. |
| 8,516,374 B2 | 8/2013 | Fleischman et al. |
| 8,600,984 B2 | 12/2013 | Fleischman et al. |

(Continued)

FOREIGN PATENT DOCUMENTS

| | | |
|---|---|---|
| EP | 2 487 636 A1 | 8/2012 |
| WO | 2016166764 A1 | 10/2016 |

OTHER PUBLICATIONS

Yi Ping Phoebe Chen, Sports Video Summarization Using Highlights and Playback, 2003 (Year: 2003).*

(Continued)

*Primary Examiner* — Cai Y Chen
(74) *Attorney, Agent, or Firm* — McCormick, Paulding & Huber LLP

(57) ABSTRACT

Methods and systems for automatic generation of sports highlights are described, where AV media data of a sporting event (game) are analyzed to identify sports highlights using a data-graph-based technique for "in-game" highlights, and "out-of-game" AV media data (e.g. post-game commentary/analysis/news) are analyzed for out-of-game content (OGC) related to each of the selected in-game highlights to produce a collective AV narrative around each of the in-game highlights selected. The format and appearance of the final highlights AV media content or video are also adjustable by the user or the highlights producer to optimize the highlight viewing experience.

28 Claims, 21 Drawing Sheets

(56) References Cited

U.S. PATENT DOCUMENTS

| | | | |
|---|---|---|---|
| 8,702,504 B1* | 4/2014 | Hughes | G06F 3/04842 |
| | | | 463/31 |
| 8,775,431 B2 | 7/2014 | Jason | |
| 9,077,744 B2 | 7/2015 | Beutel et al. | |
| 9,160,692 B2 | 10/2015 | Socolof | |
| 9,266,017 B1* | 2/2016 | Parker | A63F 13/65 |
| 9,378,240 B2 | 6/2016 | Jason | |
| 9,390,501 B2 | 6/2016 | Marty et al. | |
| 9,671,940 B1 | 6/2017 | Malik et al. | |
| 9,674,435 B1 | 6/2017 | Monari et al. | |
| 9,778,830 B1 | 10/2017 | Dubin et al. | |
| 9,912,424 B2 | 3/2018 | Sheppard et al. | |
| 9,965,683 B2 | 5/2018 | Verdejo et al. | |
| 10,133,818 B2 | 11/2018 | Fleischman et al. | |
| 2001/0048484 A1 | 12/2001 | Tamir et al. | |
| 2002/0194002 A1 | 12/2002 | Petrushin | |
| 2005/0286774 A1 | 12/2005 | Porikli | |
| 2006/0106743 A1 | 5/2006 | Horvitz | |
| 2007/0118909 A1 | 5/2007 | Hertzog et al. | |
| 2009/0067719 A1 | 3/2009 | Sridhar et al. | |
| 2009/0091583 A1* | 4/2009 | McCoy | A63F 13/02 |
| | | | 345/633 |
| 2009/0144122 A1 | 6/2009 | Ginsberg et al. | |
| 2009/0264190 A1 | 10/2009 | Davis et al. | |
| 2009/0271821 A1 | 10/2009 | Zalewski | |
| 2009/0287694 A1 | 11/2009 | McGowan et al. | |
| 2010/0030350 A1 | 2/2010 | House et al. | |
| 2011/0013087 A1 | 1/2011 | House et al. | |
| 2011/0225519 A1 | 9/2011 | Goldman et al. | |
| 2011/0244954 A1 | 10/2011 | Goldman et al. | |
| 2012/0123854 A1 | 5/2012 | Anderson et al. | |
| 2012/0151043 A1 | 6/2012 | Venkataraman et al. | |
| 2012/0215903 A1 | 8/2012 | Fleischman et al. | |
| 2013/0095909 A1 | 4/2013 | O'Dea | |
| 2013/0226758 A1 | 8/2013 | Reitan | |
| 2013/0268620 A1 | 10/2013 | Osminer | |
| 2013/0271602 A1 | 10/2013 | Bentley et al. | |
| 2014/0052785 A1 | 2/2014 | Sirpal | |
| 2014/0081636 A1 | 3/2014 | Erhart et al. | |
| 2014/0129559 A1 | 5/2014 | Estes | |
| 2014/0376876 A1 | 12/2014 | Bentley et al. | |
| 2015/0070506 A1 | 3/2015 | Chattopadhyay et al. | |
| 2015/0131845 A1 | 5/2015 | Forouhar et al. | |
| 2015/0148129 A1 | 5/2015 | Austerlade et al. | |
| 2015/0237464 A1 | 8/2015 | Shumaker et al. | |
| 2015/0244969 A1 | 8/2015 | Fisher et al. | |
| 2015/0248817 A1 | 9/2015 | Steir et al. | |
| 2015/0248917 A1 | 9/2015 | Chang et al. | |
| 2015/0318945 A1 | 11/2015 | Abdelmonem et al. | |
| 2015/0348070 A1 | 12/2015 | Boettcher | |
| 2015/0358680 A1 | 12/2015 | Feldstein et al. | |
| 2015/0375117 A1 | 12/2015 | Thompson et al. | |
| 2015/0382076 A1 | 12/2015 | Davisson et al. | |
| 2016/0034712 A1 | 2/2016 | Patton et al. | |
| 2016/0110083 A1 | 4/2016 | Kranendonk et al. | |
| 2016/0132754 A1 | 5/2016 | Akhbardeh et al. | |
| 2016/0320951 A1 | 11/2016 | Ernst et al. | |
| 2016/0342685 A1 | 11/2016 | Basu et al. | |
| 2017/0064240 A1* | 3/2017 | Mangat | H04N 5/445 |
| 2017/0255696 A1 | 9/2017 | Pulitzer | |
| 2018/0082120 A1 | 3/2018 | Verdejo et al. | |

OTHER PUBLICATIONS

Indriyat Atmosukarto, Automatic Recognition of Offensive Team Formation in American Football Plays (Year: 2013).*

Sharghi, Aidean, et al. "Query-Focused Extractive Video Summarization," Center for Research in Computer Vision at UCF, 2016, pp. 1-18.

Kim, Gunhee, et al. "Joint Summarization of Large-Scale Collections of Web Images and Videos fro Storyline Reconstruction," 2014 IEEE Conference on Computer Vision and Pattern Recognition, pp. 4225-4232.

Gupta, Abhinav, et al. "Understanding Videos, Constructing Plots, Learning a Visually Grounded Storyline Model from Annotated Videos," 2009, pp. 1-8.

Raventos, A, et al. "Automatic Summarization of Soccer Highlights Using Audio-Visual Descriptors," 2015, pp. 1-19.

Tjondronegoro, Dian, et al. "Sports Video Summarization Using Highlights and Play-Breaks," 2003, pp. 1-8.

Chauhan, D, et al. "Automatic Summarization of Basketball Sport Video,"—2016 2nd International Conference on Next Generation Computing Technologies (NGCT—2016) Dehradun, India Oct. 14-16, 2016, pp. 670-673.

Nichols, Jeffrey, et al. "Summarzing Sporting Events Using Twitter," IBM Research, San Jose, CA, 2012, pp. 1-10.

Fan, Y.C., et al. "A Framework for Extracting Sports Video Highlights Using Social Media," Department of Computer Science, National Chung Hsing University, Taichung, Taiwan, Springer International Publishing Switzerland 2015, pp. 670-677.

Agresti, Alan; Categorical Data Analysis, Second Edition-2002, pp. 436-454, Canada.

SAS/STAT(R) 9.22 User's Guide—Overview: PHREG Procedure https://support.sas.com/documentation/cdl/en/statug/63347/HTML/default/viewer.htm#statug_phreg_sect001.htm.

Andersen, P.K., et al. "Cox's Regression Model for Counting Processes: A Large Sample Study," The Annals of Statistics, 1982, vol. 10, pp. 1100-1120.

Powell, Teresa M., et al. "Your 'Survival' Guide to Using Time-Dependent Covariates," SAS Global Forum 2012, pp. 168-177.

Wackersreuther, Bianca, et al. "Frequent Subgraph Discovery in Dynamic Networks", 2010, pp. 155-162, Washington DC.

Cook, et al. "Substructure Discovery Using Minimum Description Length and Background Knowledge," Journal of Artificial Intelligence Research (JAIR), 1 (1994) pp. 231-255.

Kazantseva, Anna, et al. Linear Text Segmentation Using Affinity Propagation, Proceedings of the 2011 Conference on Empirical Methods in Natural Language Processing, pp. 284-293, Edinburgh, Scotland, UK, Jul. 27-31, 2011. Association for Computational Linguistics.

Choi, Freddy, "Advances in Domain Independent Linear Text Segmentation," Artificial Intelligence Group, Department of Computer Science, University of Manchester, England, 2000, pp. 26-33.

Lamprier, S., et al, "SegGen: A Genetic Algorithm for Linear Text Segmentation," France, 2017, pp. 1647-1652.

Hearst, Marti, "TextTiling: Segmenting Text into Multi-Paragraph Subtopic Passages," 1997, Association for Computational Linguistics, pp. 33-64.

Beeferman, Doug, et al. "Statistical Models for Text Segmentation," School of Computer Science, PA, 1999, pp. 1-36.

"BOTTARI: Location based Social Media Analysis with Semantic Web," Celino, Irene (http://citeseerx.ist.psu.edu/viewdoc/download?doi=10.1.1 .225.8097&rep1&type=pdf).

"Recursive Deep Models for Semantic Compositionality Over a Sentiment Treebank," Socher, Richard (http://nlp.stanford.edu/~socherr/EMNLP2013_RNTN.pdf).

"Detection of Abrupt Spectral Changes Using Support Vector Machines: An Application to Audio Signal Segmentation," Davy, Manuel (http://www.mee.tcd.ie/~moumir/articles/davy_1733.pdf).

"Automatic Recognition of Offensive Team Formation in American Football Plays," Atmosukarto, Indriyati (http://vision.ai.illinois.edu/publications/atmosukarto_cvsports13.pdf).

"Video Object Tracking Using Adaptive Kalman Filter," Weng, Shiuh-Ku (http://dl.acm.org/citation.cfm?id=1223208).

"Real-Time Tracking of Game Assets in American Football for Automated Camera Selection and Motion Capture," Gandhi, Heer (http://www.sciencedirect.com/science/article/pii/S1877705810003036).

Wang et al., Anomaly_Detection_ Through_Enhanced_Sentiment_Analysis_On_Social_Media_Data, IEEE 2014 6th International Conference on Cloud Computing (Year: 2014).

* cited by examiner

Fig. 9
Graph-Based Substring Table
Team A; Game: Team A vs. Team D

| Play | Nodes/Edges | ats1 | ats2 | ats3 | ats4 *** | Gm Time | Play Length | Score | DNP | # Rpts | Play Wt |
|---|---|---|---|---|---|---|---|---|---|---|---|
| G1 (P1) | v—>b | (2,0),(2,1),G | (2,0),(2,0),G | (2,0),(2,0),_ | (2,0),(2,0),_ | Q1 3:30 | 10 Sec | 15-10 | Y | 10 | 5 |
| | b—>a | (2,1),(1,0),Pa | (2,0),(1,1),_ | (2,0),(4,1),_ | (2,0),(4,0),_ | | | | | | |
| | a—>d | (1,0),(4,0),_ | (1,1),(4,0),_ | (4,1),(1,0),_ | (4,0),(1,0),_ | | | | | | |
| | d—>x | (4,0),(1,0),_ | (4,0),(1,0),_ | (1,0),(1,0),Pi | (1,0),(1,0),_ | | | | | | |
| | x—>a | (1,0),(1,0),_ | (1,0),(1,1),G | (1,0),(4,1),G | (1,0),(4,0),G | | | | | | |
| | a—>G | (1,0),_,_ | (1,1),_,_ | (4,1),_,_ | (4,0),_,S | | | | | | |
| | d—>G | (1,0),_,_ | (1,0),_,_ | (4,0),_,_ | (4,0),_,_ | | | | | | |
| | x—>b | (1,0),(2,1),G | (1,0),(2,0),_ | (1,0),(2,0),_ | (1,0),(2,0),_ | | | | | | |
| | y—>d | (4,0),(4,0),G | (4,0),(4,0),G | (1,0),(1,0),G | (1,0),(1,0),G | | | | | | |
| | summary | <1:(2,0),(2,1),G;…; (4,0),(4,0),G> | <2:(2,0),(2,0),G;…; (4,0),(4,0),G> | <3:(2,0),(2,0),G;…; (1,0),(1,0),G> | <3:(2,0),(2,0),_;…; (1,0),(1,0),G> | | | | | | |
| G2 (P2) | v—>b | (2,0),(2,1),G | (2,0),(2,0),G | (2,0),(2,0),G | (2,0),(2,0),G | Q1 5:20 | 15 Sec | 17-18 | Y | 4 | 2 |
| | b—>a | (2,1),(1,0),Pa | (2,0),(1,1),_ | (2,0),(4,1),_ | (2,0),(4,1),_ | | | | | | |
| | a—>d | (1,0),(4,0),_ | (1,1),(4,0),_ | (4,1),(1,0),_ | (4,0),(5,1),Pa | | | | | | |
| | d—>x | (4,0),(1,0),_ | (4,0),(1,0),_ | (1,0),(1,0),Pi | (1,0),(1,0),_ | | | | | | |
| | x—>a | (1,0),(1,0),G | (1,0),(1,1),G | (1,0),(4,1),G | (1,0),(4,1),G | | | | | | |
| | a—>G | _,_,_ | (1,1),_,_ | (4,1),_,_ | (4,1),_,_ | | | | | | |
| | d—>G | (1,0),_,_ | (1,0),_,_ | (4,0),_,_ | (4,0),_,_ | | | | | | |
| | x—>b | (1,0),(2,1),G | (1,0),(2,0),_ | (1,0),(2,0),_ | (1,0),(2,0),_ | | | | | | |
| | y—>d | (4,0),(4,0),G | (4,0),(4,0),G | (1,0),(1,0),G | (1,0),(1,0),G | | | | | | |
| | summary | <1:(2,0),(2,1),G;…; (4,0),(4,0),G> | <2:(2,0),(2,0),G;…; (4,0),(4,0),G> | <3:(2,0),(2,0),G;…; (1,0),(1,0),G> | <3:(2,0),(2,0),_;…; (1,0),(1,0),G> | | | | | | |

Fig. 11
DNP Table (Team A)

1100

1102

| Game # | W/L | Opp. Team | Opp. Rank | Year | DNP listing for Team A | | | | |
|---|---|---|---|---|---|---|---|---|---|
| 1 | W | B | 1 | 2017 | DNP1 | DNP2 | DNP3 | DNP4 | *** |
| 2 | W | C | 3 | 2017 | DNP1 | DNP3 | DNP5 | DNP6 | *** |
| 3 | L | D | 6 | 2017 | DNP2 | DNP7 | DNP8 | DNP9 | *** |
| 4 | L | E | 5 | 2017 | DNP7 | DNP8 | DNP10 | DNP11 | *** |
| 5 | L | D | 6 | 2017 | DNP7 | DNP12 | DNP13 | DNP14 | *** |
|  |  |  |  |  | *** | *** | *** | *** | *** |

1104

Stitching Logic

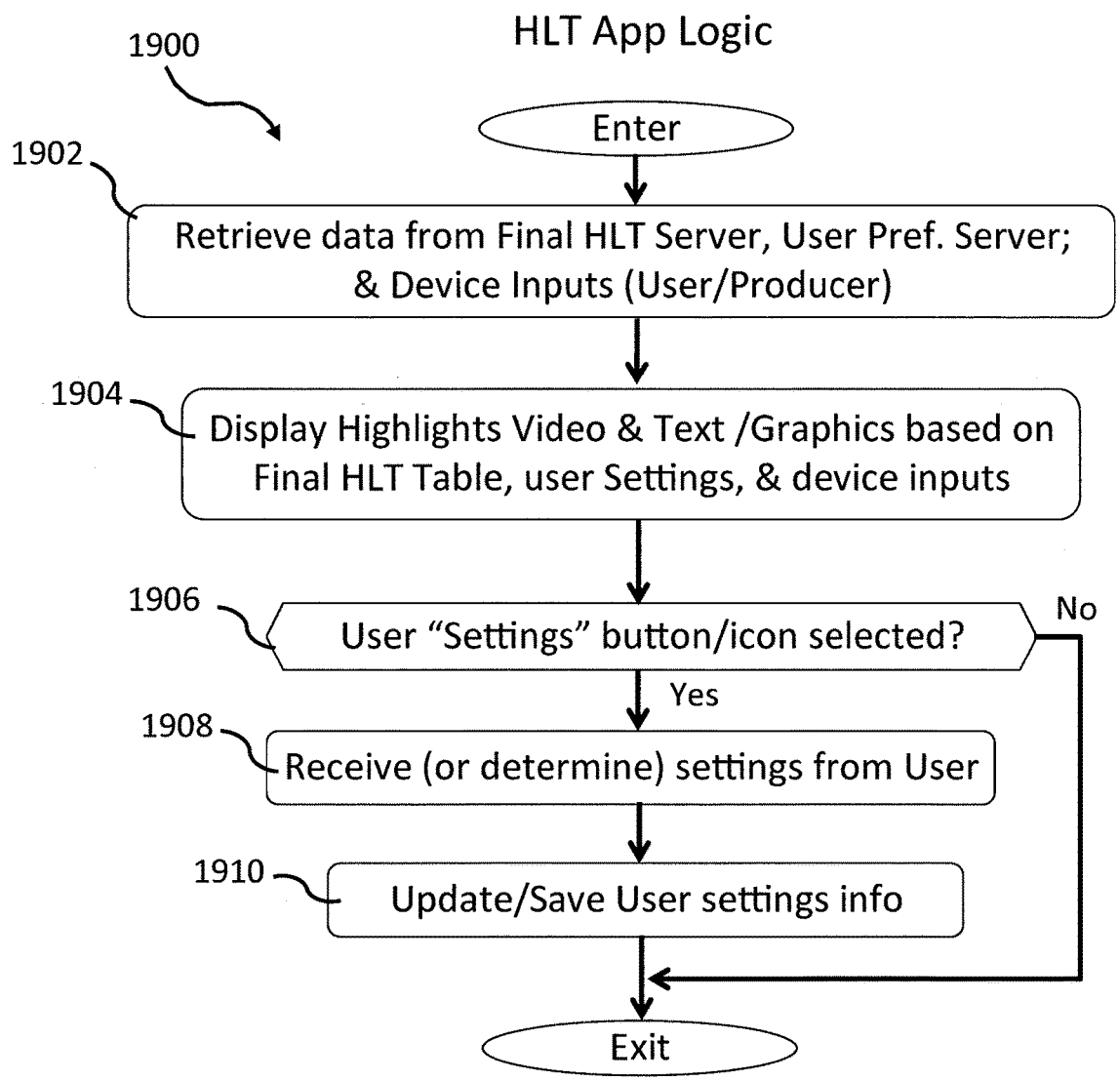

HLT App Settings

Display Format:    2002
- ☐ Show IG-HLT and OGC Videos Sequentially
- ☐ Show Videos with OGC as Picture Frame
- ☐ Show Text along:
    - ☐ Bottom; ☐ Top; ☐ Right; ☐ Left; ☐ None
- ☐ Type of IG-HLT to show:
    - ☐Traditional&Graph-Based; ☐Graph-Based; ☐Traditional

IG-HLT & OGC Content:    2004
- ☐ Max. OGCs per Highlight: ____;
- ☐ OGC Segment Length: ____ (sec) (Default=30 sec)
- ☐ Use OGC sources for In-Game HLTs after game ends for:
    - ☐ 10min; ☐ 15min; ☐ 30min; ☐ 1 hr; ☐ None
- ☐ Sample time window for post-game OGC:
    - ☐ 30min; ☐ 1hr; ☐ 2hr; ☐ 8 hr; ☐ 1day; ☐ No limit
- ☐ Exclude OGC Sports Shows:
    - __(FirstTake, Mike&Mike, PardonInt, etc.)__ <>(drop-down)
- ☐ Exclude OGC Sports Commentators:
    - __(T.Romo, J.Nantz, P.Manning, etc.)__ <>(drop-down)
- ☐ Exclude OGC Types:
    - ☐ Video; ☐ Radio; ☐ Closed Caption; ☐ Press Conf.
    - ☐ Post-Game Interviews; ☐ Expert panels
- ☐ Show only highest weighted components
- ☐ Play Wt Threshold: __; ☐ OGC Wt Threshold: __; (1-5)

User Attributes/Characteristics:    2006

User Type:  ☐ HLT Producer ; ☐ General App User
- ☐ Age Group: ☐ <18; ☐ 18-21; ☐ 22-30; ☐ 31-40; ☐ 41-50;
    - ☐ 51-60; ☐ 61-70; ☐ >70
- ☐ Location/Home Address: __City X, State Y__ <>(drop-down)

Final Highlights Table
(Game: Team A v Team B)

| Highlight # | In-Game Highlights (IGH) | Related Out-of-Game Content (OGC) | | | | |
|---|---|---|---|---|---|---|
| H1 | H1-IGH | H1-OGC1 | H1-OGC2 | H1-OGC3 | *** | H1-OGCn |
| H2 | H2-IGH | H2-OGC1 | H2-OGC2 | H2-OGC3 | *** | H2-OGCn |
| H3 | H3-IGH | H3-OGC1 | H3-OGC2 | H3-OGC3 | *** | H3-OGCn |
| *** | *** | *** | *** | *** | *** | *** |
| Hn | Hn-IGH | Hn-OGC1 | Hn-OGC2 | Hn-OGC3 | *** | Hn-OGCn |

SYSTEM AND METHOD FOR AUTOMATIC GENERATION OF SPORTS MEDIA HIGHLIGHTS

BACKGROUND

Creating narrative, i.e., story driven, highlights describing sports games, (where games includes any type of contests, including matches, etc.), involves significant human capital. Human efforts usually involve watching and editing game media footage and selecting related content such as that from interviewers, which can be inefficient. It is possible that a company has access to a range of sports content, but does not have the resources to actually produce the highlights, especially for content with significantly smaller numbers of viewership (such as games between smaller market teams and events around less popular athletes).

In addition, to serve a broad population of sports fans, and extract the value from as much content as possible (e.g., advertising), highlights should be produced for as many games and markets as possible, in an efficient manner while retaining a feel of narration.

Accordingly, it would be desirable to have a method and system that overcomes these issues and provides sports highlights in view of the aforementioned factors or requirements.

BRIEF DESCRIPTION OF THE DRAWINGS

FIG. 9 is a table of frequent static sub-graph for plays for a sports team for a game, in accordance with embodiments of the present disclosure.

FIG. 11 is a table showing dynamic normative patterns (DNPs) for a given team, in accordance with embodiments of the present disclosure.

FIG. 19 is a flow diagram of an HLT software application (HLT App), in accordance with embodiments of the present disclosure.

FIG. 20 is a screen illustration of a settings screen for setting options for the HLT software application (HLT App), in accordance with embodiments of the present disclosure.

DETAILED DESCRIPTION

Figure 1:
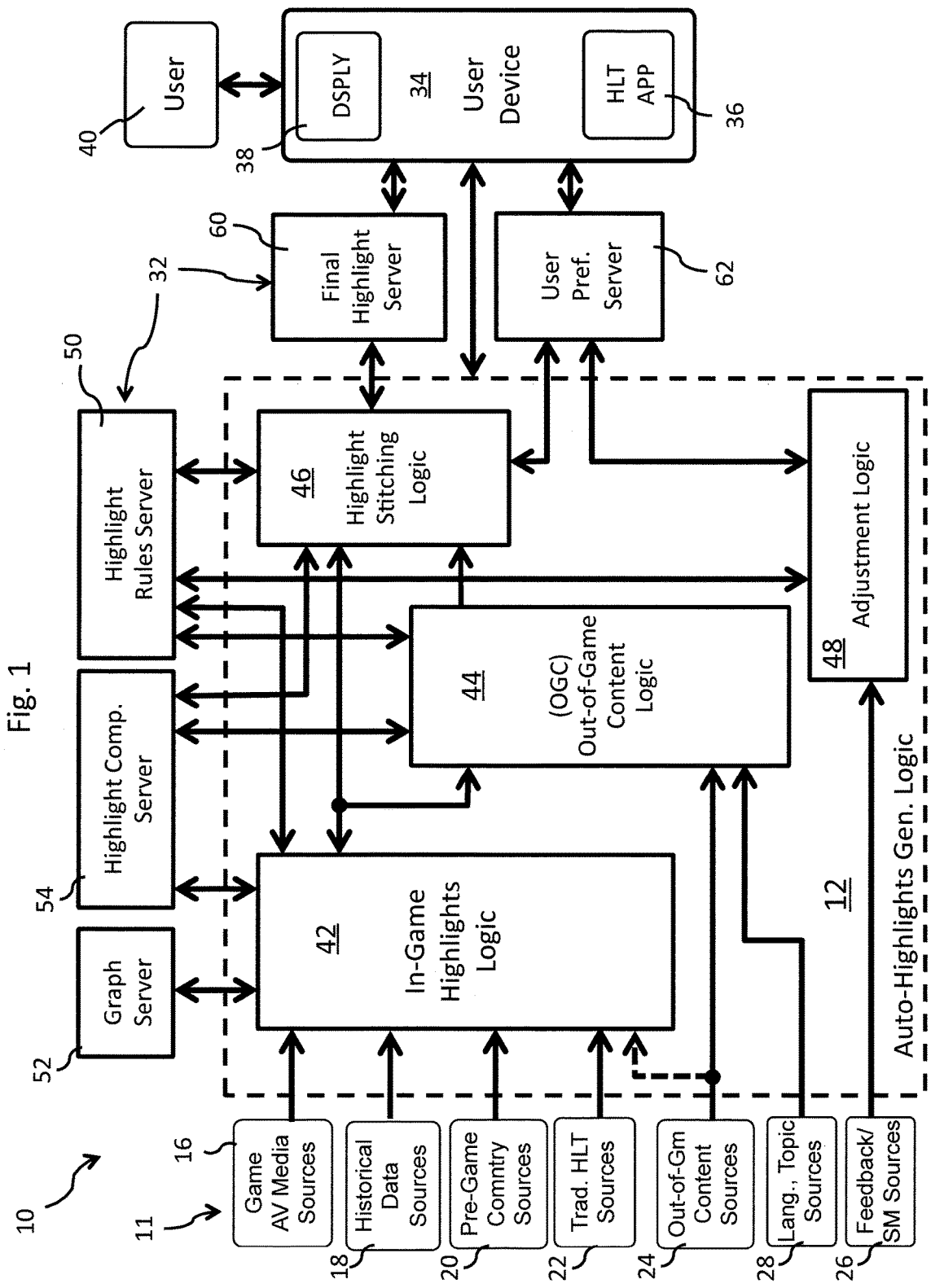
FIG. 1 is a top-level block diagram of components of a system for automatic generation of sports media highlights, in accordance with embodiments of the present disclosure.

As discussed in more detail below, the present disclosure is directed to system and methods for automatically generating sports media highlights. In particular, system and methods of the present disclosure identify segments of audiovisual (AV) media corresponding to "highlights" (or events of interest) within a larger sporting event (such as a basketball, football, soccer, hockey, or baseball game or other sporting event or match), i.e., "in-game" highlight clips or segments or in-game highlight events (or HEs), that meet certain criteria, such as having an effect (or impact) on the outcome of the game or other criteria, e.g., using statistical and pattern-based properties of athlete/team performance or actions. It also identifies content or commentary that is relevant and related to the identified in-game highlight clips or segments, i.e., related "out-of-game" commentary or content (OGC) segments. Also, it "stitches" (or weaves or combines) together the in-game highlights and out-of-game content to form a final highlight "narrative" AV media content, or "narrative-based" highlight, which can be viewed on a user's mobile device or computer or broadcast on TV or internet broadcast. It may also adjust or re-tune (or perform learning on) the logic (or corresponding rules) that identifies the in-game highlight, that selects the out-of-game content or commentaries (OGC's), and that stitches together the final resulting highlight narrative for viewing by the users or viewing audience, based on user or other feedback.

The combination of the in-game highlights (graph-based, traditional, or both) with the related out-of-game content (or commentary) OGC may be referred to herein as a "narrative-based highlight", because it contains an aggregation of AV clips associated with the game highlight, which provides more of a narrative (or story or broader context) around the specific game highlight event, and which provides a more enjoyable and informative highlight viewing experience for the user than watching a single AV clip of a highlight event in a game. As described further herein, the narrative-based highlight may have one or more clips for the "in-game" highlight portion (including graph-based, traditional or both).

In some embodiments, the present disclosure may provide highlight AV clips without out-of game content (OGC), using graph-based highlights alone or a combination of graph-based and traditional highlights. When used as a combination of graph-based and traditional highlights, it may still be deemed as a narrative-based highlight, as it shows more than just a single highlight, such as that shown in herein. When highlight AV media clips or content are provided using graph-based highlights alone, the visualization and related other aspects of the present disclosure would be adjusted accordingly.

Also, in some embodiments, the present disclosure provides sports narratives (i.e., narrative-based sports highlights), regarding what events or plays (or game activity patterns) most likely led to the outcome of the game, or impacted the outcome, or another significant attribute, of the game (e.g., record-breaking play, key defensive stop, and the like). For example, in some embodiments, the present disclosure automatically identifies and analyzes multi-player (or team-based) strategies, including anomalous strategies, using graph-based techniques, which enables the analysis of multiple players actions during a given play (or portion thereof or set of activities). Such a data-graph-based technique also enables this analysis in connection with plays that most likely lead to the outcome of a game (or other significant attribute of the game). In some embodiments, the present disclosure also uses game commentary data and footage to identify critical moments in a game and includes non-game or out-of-game media in the final highlight AV media package (or video) content to provide a comprehensive highlight viewing experience.

FIG. 1 illustrates various components (or devices or logic) of a system 10 for automatically generating sports media highlights of the present disclosure, which may include Auto-Highlights Generation Logic 12, which may have various components (or devices or logic), including In-Game Highlights Logic 42, Out-of-Game Content Logic 44, Highlight Stitching Logic 46, and Adjustment Logic 48, which may operate together and communicate with each other to perform the functions described herein.

The Auto-Highlights Generation Logic 12 may receive inputs from a plurality of data sources 11, including In-Game AV (audio/visual) media sources 16 (including in-game data and metadata), Historical Data sources 18, Pre-Game Commentary sources 20 (including audio or visual media and closed-captioned or subtitled text data or other data), Traditional Highlight Sources 22, Out-of-Game Content Sources 24, Feedback/Social Media Data Sources 26, and Language/Topic Data Sources 28. Auto-Highlights Generation Logic 12 may also communicate with one or more digital data servers 32 (discussed more hereinafter), which may hold data or logic used by the system of the present disclosure as described herein. The servers 32 may include a Highlights Rules Server 50, Graph Server 52, Highlight Components Server 54, Final Highlights Server 60, and User Preferences Server 62. Other servers or server configurations may be used if desired to perform the functions described herein. The in-game metadata may include: teams played, team home/away information, game date, final score, real time running score with time stamps (may also include basic static graph data described herein), play-by-play data (i.e., what play was run at what game clock/time) and special game notable or outcome-related factors such as: overtime (OT), major injury, record breaking play, major controversy, fight, technical foul, ejection, fan interference, upset, buzzer beater, sudden-death win/loss, and the like.

Some of the servers 32, such as the Final Highlight Server 60 and the User Preferences Server 62, may communicate with a computer-based user device 34, such as a smart phone, laptop, or other device (discussed more hereinafter). The user device 34 may have a Highlight software application (HLT App) 36 (discussed more hereinafter) loaded thereon and a display 38, and the device 34 may communicate or interact with a user 40. Also, the logic 12 may also communicate directly with the user device 34.

The In-Game AV (audio/visual) media sources 16 provide digital source media data for a given sporting event, for analysis by the In-Game Highlights Logic 42, which identifies and extracts in-game highlights, as discussed herein. The AV media sources 16 may include playback servers or other digital storage devices that store the audio and visual content (or footage) of the game to be reviewed for highlight events. The Historical Data Sources 18 provide digital data regarding historical sports event and statistics data for the two or more individuals or teams that are playing in the current game, which help determine events and patterns of interest for the In-Game Highlights selection rules or weightings used by the In-Game Highlights Logic 42. The Pre-Game Commentary Sources 20 provide digital data regarding pre-game commentary from sports experts, social media, news, and the like, which help determine events and patterns of interest, such as describing anticipated notable events that may occur in the game, which may be used for the In-Game Highlights selection rules or weightings used by the In-Game Highlights Logic 42.

The Traditional Highlight Sources 22 provide digital data regarding traditional (or normal or typical) highlights identified from in-game footage, such as last-second victory, record-breaking play, season ending injury, and the like obtained from various known or existing sources, including directly from game footage, sports experts, social media, game metadata, and the like, which may also be help determine events and patterns of interest for the In-Game Highlight selection rules or weighting factors, which may be used by the In-Game Highlights Logic 42. The Out-of-Game Content Sources 24 provide digital data regarding out-of-game content or commentary from sports experts, social media, and the like (e.g., "sports shows"), which may be used by the out-of-game content (OGC) logic 44 to identify out-of-game content related to the selected in-game highlights (discussed herein), and may also optionally used by the In-Game Highlights Logic 42 to help determine events of interest for the In-Game Highlights selection rules or weighting factors. For example, if an after-game (or halftime analysis) show identifies a particular play or highlight event, it may influence whether that play is included in the selected In-Game Highlights, e.g., by affecting the play weighting factor for that play (see Table 900, FIG. 9).

The Feedback/Social Media Data Sources 26 provide digital data regarding feedback from viewers of the Highlights using the HLT App 36 or viewers watching the Highlights on TV or other display device, provided from a Social Media source, such as Facebook®, Twitter®, a Blog post, Google+® (or Google Plus), Instagram®, Flickr®, Digg®, and the like, which is provided to the Highlight Adjustment Logic 48 which adjusts the rules or the weightings, or the logics (42,44,46) associated with the selection of In-Game Highlights, the related out-of-game commentary or content (OGC), or the audio/video content presentation of the narrative-based Highlights as discussed herein. The user device 34 may be a computer-based device, such as a smartphone, a tablet, a smart TV, a laptop computer, a desktop computer (PC), cable set-top box, or the like, or may be just a display device, such as a television or display monitor that the user 40 may view or watch. The device 34 may also include the HLT App 36 loaded (or stored) thereon, for providing a desired graphic user interface or GUI or visualization (as described herein) on the display 38 for viewing the game highlight events on the device 34. The HLT App 36 runs on, and interacts with, a local operating system (not shown) running on the computer (or processor) within the user device 34, and may also receive inputs from the user 40, and may provide audio content to audio speakers/headphones (not shown) and video content to the visual display 38 of the user device 34. The user 40 may interact with the user device 34 using the display 38 (or other input devices/accessories such as a keyboard, mouse, or the like) and may provide input data to the device 34 to control the operation of the HLT software application 36 running on the user device 34 (as discussed further herein). The display 38 also interacts with the local operating system on the device 34 and any hardware or software applications, video and audio drivers, interfaces, and the like, needed to view or listen to the desired media and display the appropriate graphic user interface (GUI) for the HLT App 36.

Figure 2:
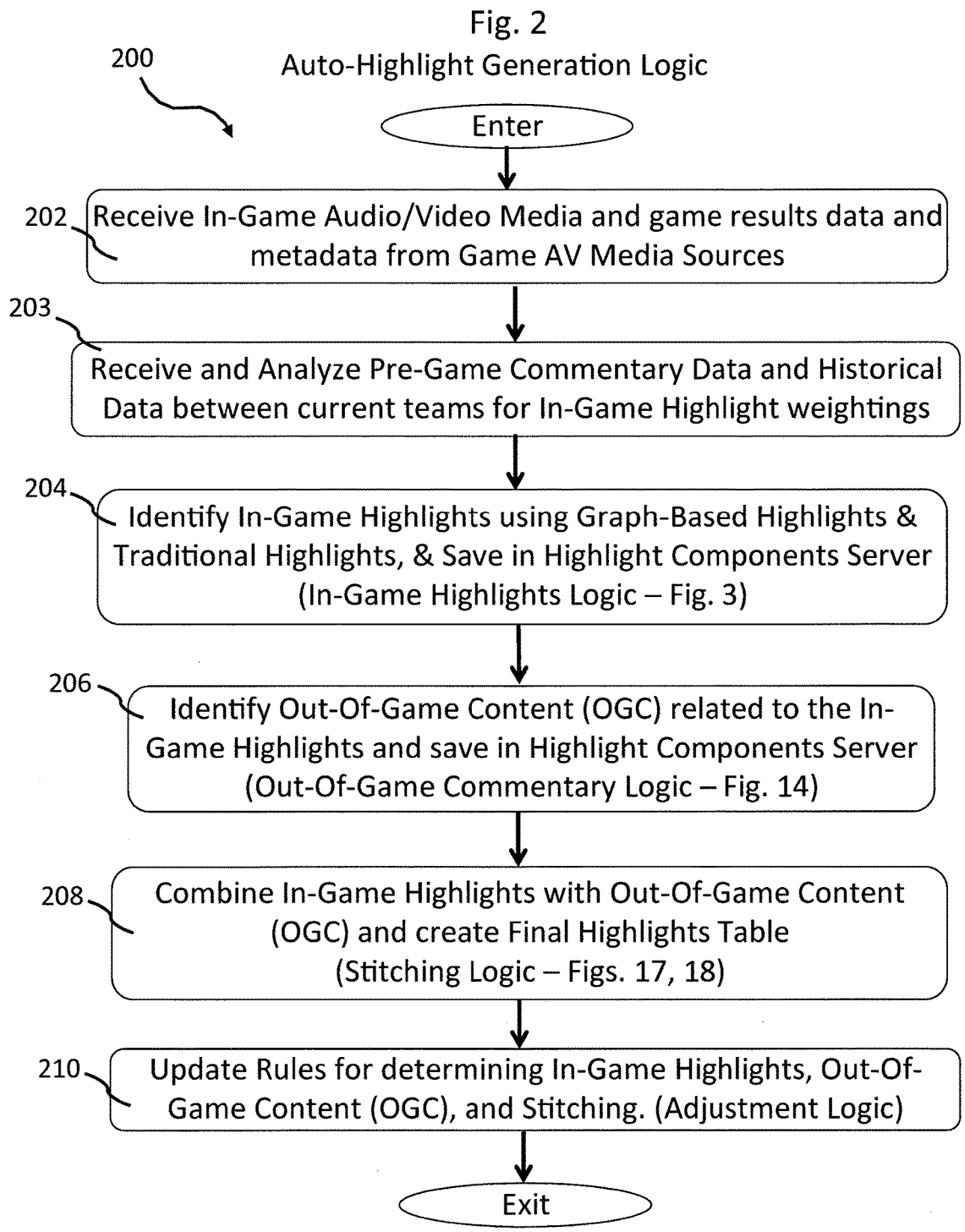
FIG. 2 is a flow diagram of one of the components of FIG. 1, in accordance with embodiments of the present disclosure.

Referring to FIG. 2, a flow diagram 200 illustrates one embodiment of a process or logic for implementing the automatic generation of sports highlights, which may be implemented by the Auto-Highlights Generation Logic 12. The process/logic 200 begins at block 202 by retrieving game results data including Game metadata and game audio/video data from the Game AV Media Sources 16 (FIG. 1), and other game-related data such as historical data from the Historical Data Sources 18, pre-game commentary data from the Pre-Game Commentary Sources 18, traditional (or normal) highlights data from the Traditional Highlight Sources 22 or the Game AV Media Sources 16, and optionally out-of-game commentary data from the Out-of-Game Content (or Commentary) Sources 24. The retrieved data may be used by the various logics discussed herein.

Next, a block 203 receives and analyzes historical data (e.g., historical sports event and statistics data) for the two teams playing in the current game, from the Historical Data Sources 18 (FIG. 1), which help determine events and patterns of interest for the In-Game Highlights selection rules or weightings (or weighting factors), e.g., if the last two times these teams met there was a technical foul called due to rough play, terms such as "technical foul" and "rough play" may be flags to look for in the real-time game commentary or game metadata and may be given higher weight, e.g., higher play weighting factor ("Play Wt") for graph-based highlights (Table 900, FIG. 9) or higher traditional highlight weighting factor, by the logic.

The block 203 also receives and analyzes pre-game commentary data from sports experts, social media, news, and the like, to help determine high priority events and patterns of interest for the In-Game Highlights selection rules or weightings. The logic may use natural language processing (NLP) to identify potentially interesting events base on measuring similarity between play-by-play and statistics mentioned by commentators. For example, if a pre-game commentary show mentions "team A's 'pick and roll' could be a factor," then "pick and roll" events/plays or plays that meet this movement pattern, may be given higher weight or higher play weighting factor (e.g., "Play Wt", Table 900, FIG. 9) by the logic.

Alternatively, in some embodiments, the In-Game Highlight itself (after play selection) may be weighted (or have a weighting factor), which may be used in determining which In-Game Highlights (IGHs) are put into the In-Game Highlights Table 1206 (FIG. 12) or are put into the Highlights Components Table 1704 (FIG. 17) or are put into the Final Highlights Table 2100 (FIG. 21) and used in the Final Highlights AV media content (or video). In that case, any of the weightings discussed herein may be applied to such a weighting factor.

Next, at block 204, the logic identifies In-Game Highlights (IGHs or IG Highlights) using Graph-Based Highlights (discussed hereinafter), Traditional Highlights and highlight selection rules and weighting factors, and saves the results in the Highlight Components Server 54, as discussed further herein with the In-Game Highlights Logic (IG HLT Logic) 42. Next, block 206 identifies Out-of-Game Content (OGC) related to the selected In-Game Highlights using commentary selection rules and weighting factors and the Out-of-Game Content (or Commentary) Logic 44 and saves the results in the Highlight Components Server 52, as discussed further herein with the Out-of-Game Content (OGC) Logic 44. Next, block 208 stitches the OGC and In-Game Highlights (IGH) together to create the Final Game Highlights or Final Highlights or Final HLTs using stitching rules and weighting factors, as discussed further herein with the Highlight Stitching Logic 46. Next, block 210 (Adjustment Logic 48, FIG. 1) updates the various rules for generating the Final Highlights (e.g., highlight selection rules, commentary selection rules, stitching rules, and the like) and adjusts how the Final Highlights (or Highlight Components or Highlight stitching) are created in response to user preferences, weighting factors, and feedback from users and various other feedback sources, as described herein. The Adjustment Logic 48, may monitor the feedback data and learn over time what is the best user highlight viewing experience from user feedback (e.g., specific user feedback and general social media user feedback) using machine learning techniques and classifiers, such as support vector machines (SVMs), neural networks, decision tree classifiers, logistic regression, random forest, or any other machine learning or classification techniques that perform the functions of the present disclosure. The Adjustment Logic 48 may also be used to set or adjust settings and default parameters, preferences, rules, weightings, and the like, such as those shown in FIG. 20 (HLT App Settings). Then, the logic exits.

Figure 3:
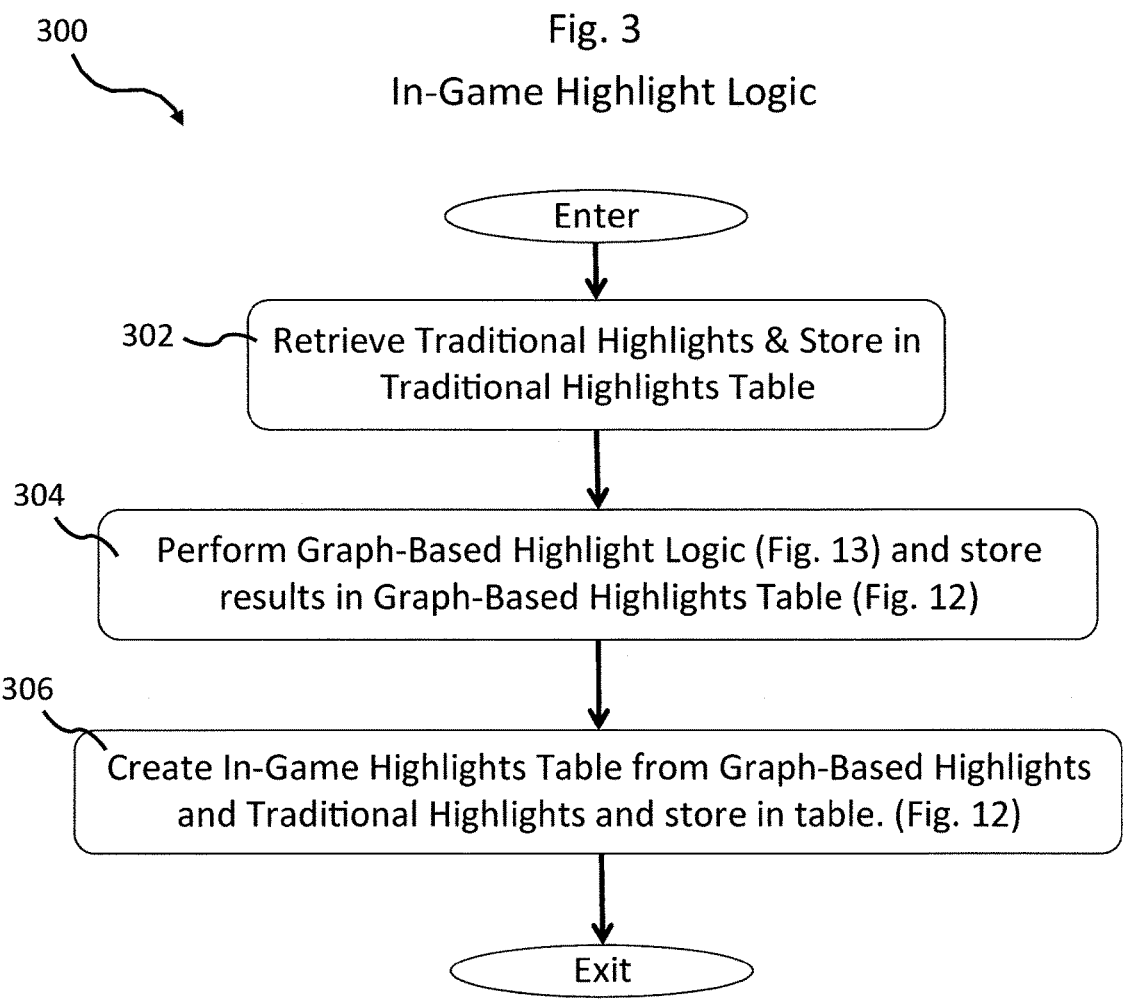
FIG. 3 is a flow diagram of one of the components of FIG. 1, in accordance with embodiments of the present disclosure.

Referring to FIG. 3, a flow chart 300 shows one embodiment for the In-Game Highlight Logic 42, which begins at block 302, which obtains or retrieves traditional In-Game highlights and stores them in a Traditional Highlight table 1204 (FIG. 12) on the Highlights Components Server 54, discussed further herein. Next, at block 304, the logic performs Graph-Based Critical Strategy Highlight Analysis (or logic) or Graph-Based Highlights Logic (FIG. 13) and stores the results in a Graph-Based Highlights Table 1202 (FIG. 12) on the Highlights Components Server 54, as discussed further herein. Next, at block 306, the logic creates (or builds) the In-Game Highlights from the Graph-Based Highlights and the Traditional Highlights and stores the results in an In-Game Highlights Table 1206 (FIG. 12) on the Highlights Components Server 54, as discussed hereinafter. Then, the logic exits.

Figure 4:
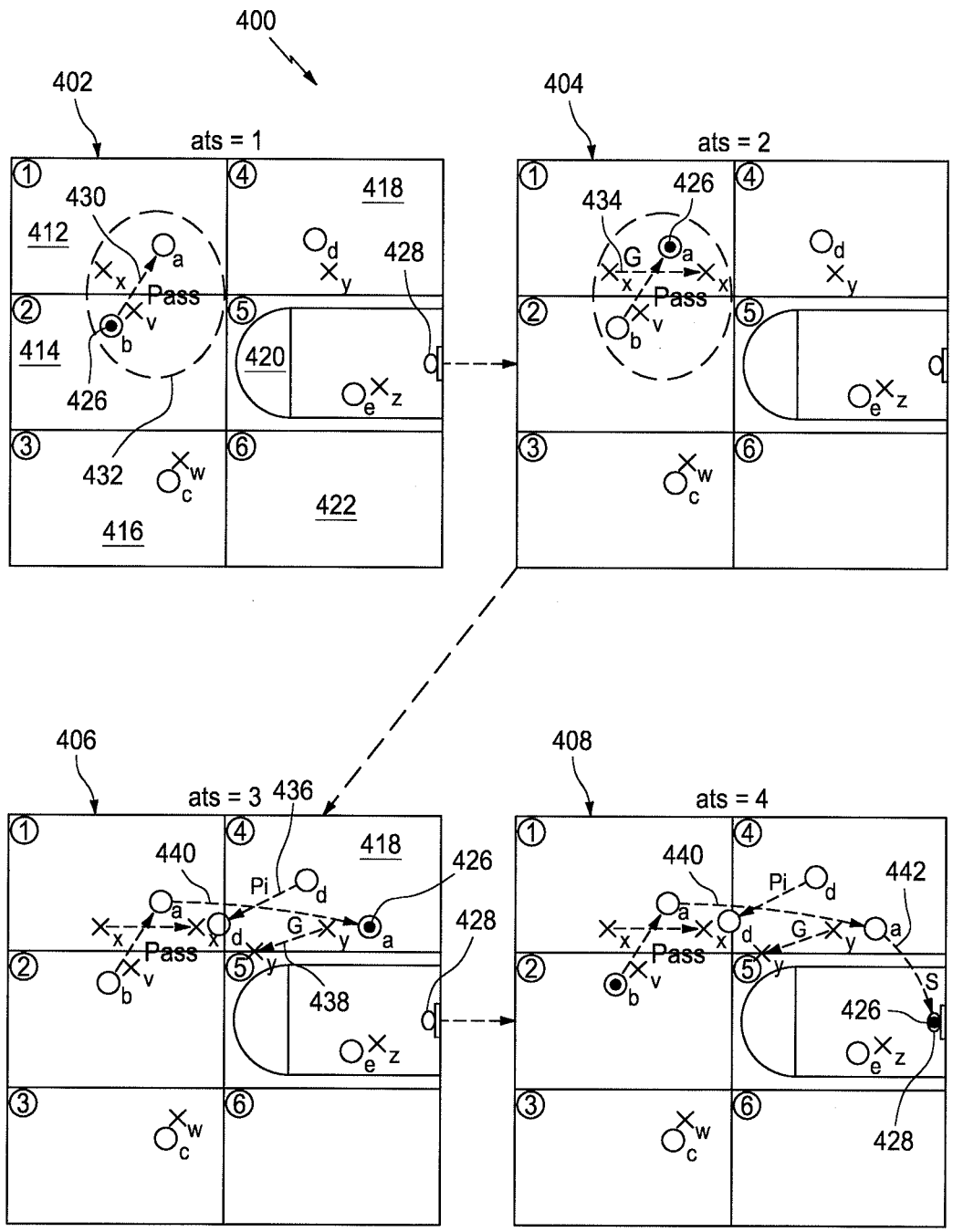
FIG. 4 is a diagram of a sequence of activities of a play on a basketball court, in accordance with embodiments of the present disclosure.
Figure 5:
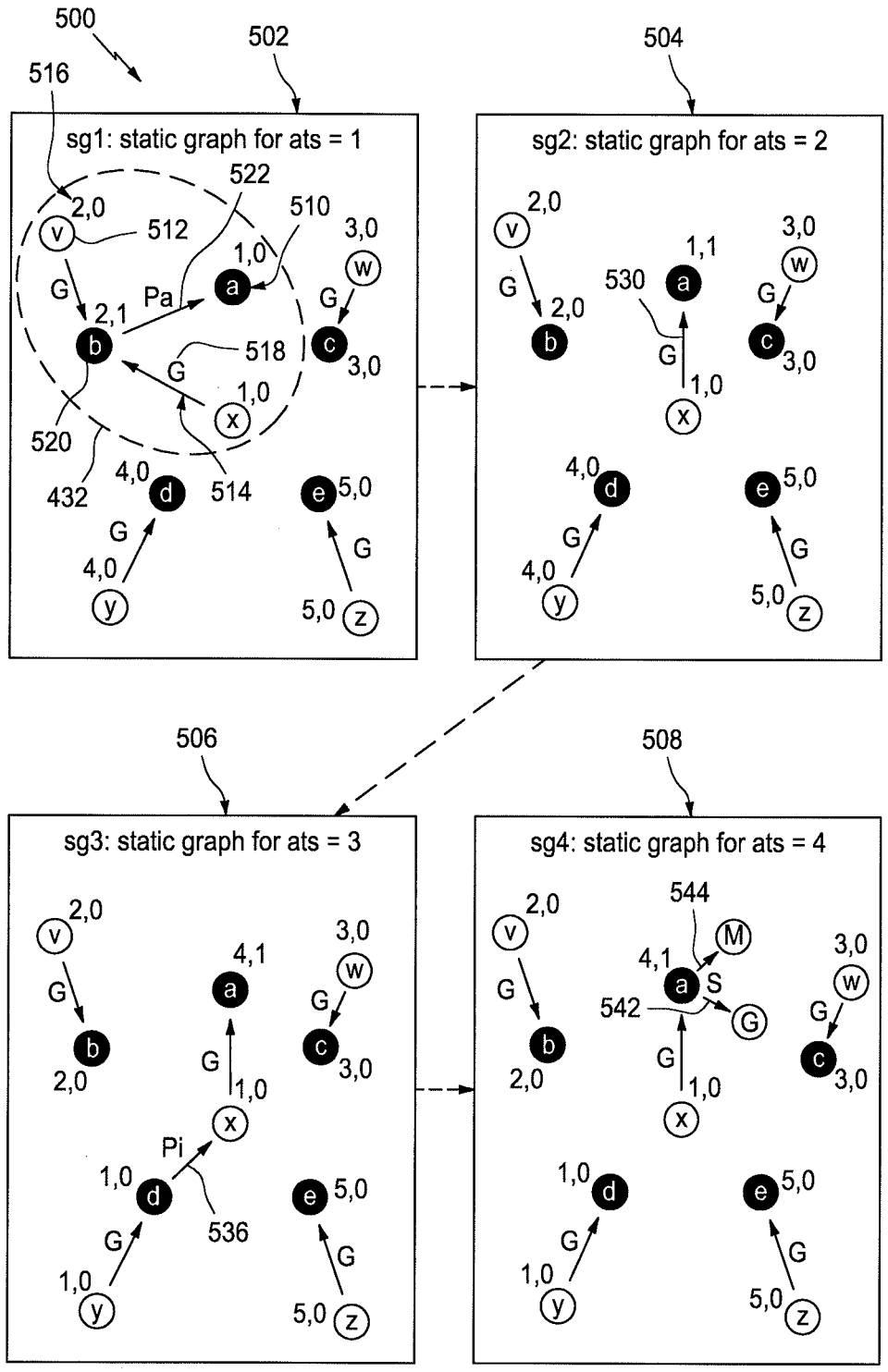
FIG. 5 is a data graph diagram of the sequence of activities for the play of FIG. 4, in accordance with embodiments of the present disclosure.

Referring to FIGS. 4 and 5, the present disclosure may use the Graph-Based Highlight Logic (e.g., block 304, FIG. 3)

as part of the In-Game Highlight Logic 42 (FIG. 1) to perform a graph-based approach to identify critical strategies or high priority events of interest or Highlights or Highlight Events that may contribute to the outcome of the game being analyzed, which may be referred to herein as or Graph-Based Highlights (GBHs or GB-HLTs). To identify Graph-Based Highlights (GBHs) of a game, the game may be viewed as a series of plays, and each play viewed as a series of activities, actions, or movements. Individual activity snapshots (or frames or time steps) of a play or portion thereof (or game strategy), including all (or a predetermined number of) players on the court or field of play, both offensive and defensive entities, may be represented as individual "activity graphs." Start and stop events defining a "play" or portion thereof (i.e., the beginning and end of a play or play portion) can be identified by pre-defined "play" rules (e.g., turnovers, scores, whistle-blow, play stoppage, injury, color commentary, and the like).

More specifically, referring to FIG. 4, four traditional basketball play diagrams 402-408 are shown for four respective activity/time steps (ats=1, ats=2, ats=3, ats=4, or ats1, ats2, ats3, ats4, respectively) for a given play, e.g., a "pick and shoot" play. Each diagram 402-408 represents a snapshot in time for the play, showing basketball players on a half-court basketball diagram using traditional X's and O's for defense and offense, respectively, the half-court having six (6) regions or sections 412-422, labeled 1-6, respectively, with five offensive players (a,b,c,d,e) labeled as Oa, Ob, Oc, Od, Oe and five defensive players (or defenders) (v,w,x,y,z) labeled as Xv, Xw, Xx, Xy, Xz. Black circles 426 in the center of the offensive player "O" indicate ball possession by that player and the basket is shown as 428.

In this example, at activity snapshot (or time step, or frame, or timestamp) ats=1 (the beginning of this play), the offensive player Ob is guarded by two defensive players (or defenders) Xv, Xx (double teamed), and Ob passes the ball to offensive player Oa located in region 1, as indicated by a dashed line 430. This portion of the activity is shown within a dashed perimeter line 432. Next, the diagram 404 at activity time step ats=2 shows the defender Xx moves within region 1, as shown by dashed line 434, to guard offensive player Oa, who now has the ball 426. Next, the diagram 406 at activity time step ats=3 shows the offensive player Od moves to region 1 to set a pick on the defender Xx in region 1 (who is guarding Od), as shown by dashed line 436. Also, the offensive player Oa dribbles with the ball 426 into region 4 (418) on the court toward the basket 428 (i.e., Oa cuts toward the basket), as indicated by a line 440, and the defender Xx is blocked by the offensive player Od (who set the pick). Next, the diagram 408 at activity time step ats=4 shows the offensive player Oa takes an uncontested shot at the basket 426 and makes the shot (ball 426 shown inside the basket 428). One reason this play is effective, is because the pick 436 set by Od on defender Xx allows Oa to cut to the basket 428 without being guarded by Xx, giving Oa an uncontested shot before the defender Xx can get back in position to guard Oa. It should be noted that offensive players Oc,Oe, were guarded by defenders Xw,Xz, respectively, but were not involved in the above play.

Referring to FIG. 5, the four activity snapshots 402-408 shown for the "pick and shoot" basketball play described above with FIG. 4, may be represented by a network data structure (or data network graph or data graph) in FIG. 5 having four corresponding "static" data graphs 502,504,506, 508 (or sg1,sg2,sg3,sg4) for the four respective activity time steps (ats=1, ats=2, ats=3, ats=4). In that case, the five offensive players (a,b,c,d,e) are shown as solid black circles 510 and the defensive players (defenders) (v,w,x,y,z) are shown as white-center circles 512. Each of the circles 510,512 may be defined as "nodes" (or "vertices") in the data graph and each of the arrows 514 may be defined as "edges" (or "links") of the data graph (as is typically done for data network graphs), to provide a graph-based strategy representation of a basketball play of the present disclosure. Each of the nodes 510,512 and each of the edges 514 may have an associated label (or data) 516,518, respectively. In this case, the label (or data) format for the nodes 516 is <player location, ball possession>, where player location is defined as a region (1-6) on the court and ball possession is 1 (ball) or 0 (no ball), and the label (or data) format for the edges 514 is <player action>, e.g., pass (Pa), pick (Pi), guard (G), shoot (S), etc. There may also be nodes G,M defined for the basket, shown as shaded, where the node G is for a score (or goal) and node M is for a miss, as shown in data graph 508. Other node definitions, labels and label formats may be used if desired.

Also a network data structure graph may be created out of the entire game, or a series of plays that make up a game, having the "nodes" and "edges" data format structure as discussed herein, if desired. For example: Graph 1 (game 1) time sequence format=Win; Graph 2 (game 2) time sequence format=Win; and Graph 3 (game 3) time sequence format=Loss.

As discussed herein, the four "static" data graphs 502-508 (or sg1-sg4, respectively) are shown, for the "pick and shoot" play, where each of the static data graphs 502-508 represents a snapshot in time (ats=1, ats=2, ats=3, ats=4, respectively) during the play, with the nodes and edges having data labels as described herein above, and the corresponding play graph as described hereinafter. In particular, data graph 502 (g1) for ats=1 is the static data graph representation of the activity play diagram 402 (FIG. 4) and the graph activity portion 432 of the graph 502, is the same as in the activity portion 432 in the play diagram 402 (FIG. 4). More specifically, in the graph 502, the offensive player b (solid black circle with a white "b" in center) 520 has the ball and is located in region 2 of the court (FIG. 4), as indicated by the data label [location, ball possession]=[2,1] next to the black circle "b" 520. The defender v (Xv in FIG. 4), is located in region 2 without the ball [2,0] and defender x (Xx in FIG. 4) located in region 1 without the ball [1,0], are both guarding (as indicated by the labels "G") offensive player b in region 2 with the ball [2,1], and player b initiates a pass (as indicated by the label "Pa") on a line 522 to offensive player a (Oa in FIG. 4), located in region 1 without the ball [1,0]. Thus, offensive player b in region 2 is double teamed by defenders x and y and offensive player a in region 1 is open to receive a pass. The other offensive and defensive players on the court are paired-up and located in other regions of the court, but not involved in the play for activity time step ats=1. In particular, defender w is guarding (G) player c both in region 3 without the ball [3,0],[3,0], respectively, defender y is guarding (G) offensive player 4 both in region 4 without the ball [4,0],[4,0], respectively, and defender z is guarding (G) offensive player e both in region 5 without the ball [5,0],[5,0], respectively.

Next, the graph 504 at activity time step ats=2 shows the defender x moves in region 1, as shown by a line 530, to guard (G) offensive player a, who now has the ball in region 1: [1,0],[1,1], respectively. Also at ats=2, defender v is guarding (G) offensive player b both in region 2 without the ball [2,0],[2,0], respectively, defender w is guarding (G) offensive player c both in region 3 without the ball [3,0], [3,0], respectively, defender y is guarding (G) offensive player d both in region 4 without the ball [4,0],[4,0], respectively, and defender z is guarding (G) offensive player e in region 5 without the ball [5,0],[5,0], respectively.

Next, the graph 506 at activity time step ats=3 shows the offensive player d moves to region 1 to set a pick (Pi) on the defender x in region 1 (who is guarding offensive player a), as shown by a line 536. Also, the offensive player a dribbles the ball into region 4 [4,1], and the defender x stays in region 1 [1,0], because he is blocked by the offensive player d (who set the pick). Also, defender y is still guarding (G) offensive player d both now in region 1 without the ball [1,0],[1,0], respectively. The other players on the court did not change their positions or actions in the frame.

Next, the graph 508 at activity time step ats=4 shows the offensive player a takes a shot (S) at the basket as shown by a line 542 and makes the shot, thus the line 542 points to a Node G (for goal scored). If the shot was missed, a line 544 would point to a Node M (for goal missed). The other players on the court did not change their positions or actions in this activity time step or frame.

Figure 6:
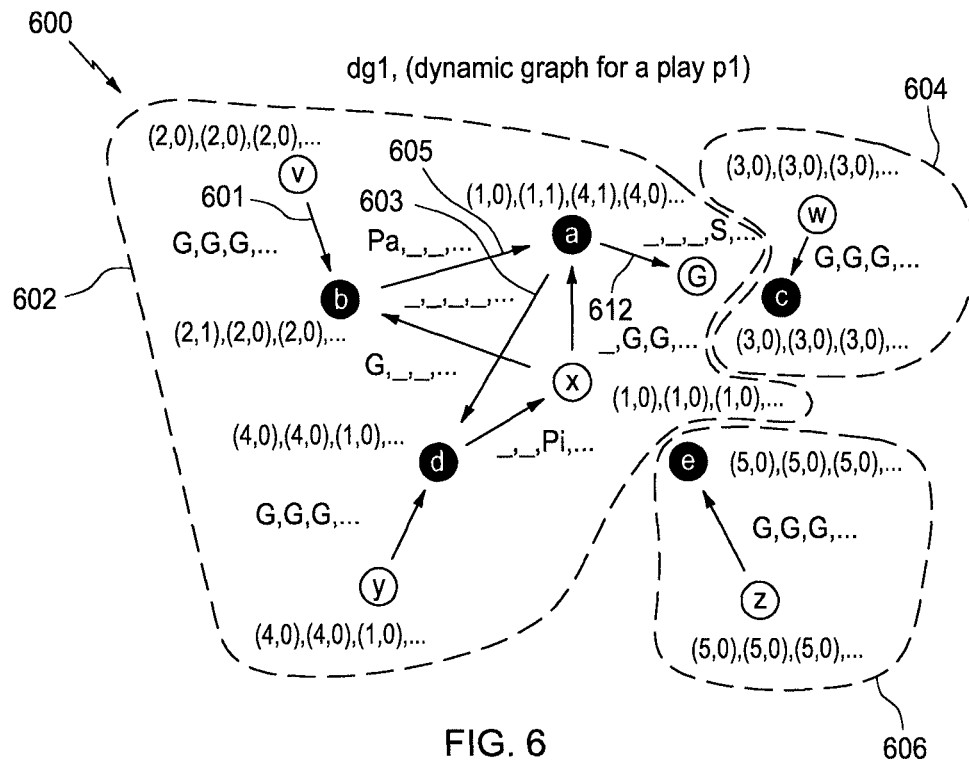
FIG. 6 is a diagram of a dynamic data graph for the play of FIG. 5, in accordance with embodiments of the present disclosure.

Referring to FIG. 6, once individual static activity graphs have been created (or received or retrieved) for each activity snapshot or time step, the individual activity graphs (from multiple snapshots) may be combined into a composite or "dynamic" graph to represent an entire play (or portion thereof). Each of the plays may also be combined or aggregated to represent an entire game. In particular, the individual activity graphs 502-508 (FIG. 5) for the "pick and shoot" play, e.g., play P1, can be combined into a composite or dynamic graph "dg1" 600 for the play P1. In that case, the data label format for nodes <player location, ball possession> and edges <player action> for each activity time step ats may be aggregated for each node (or vertex) and for each edge (or link) for the play P1, as shown in FIG. 6. For example, the dynamic graph dg1 for the play P1 at node v (defender v) would show the four node data labels <player location, ball possession>, e.g., [(2,0),(2,0),(2,0),(2,0)], and the edge 601 would show the four edge data labels <player action>, e.g., G,G,G,G, corresponding to the four activity time steps (ats1-ats4), respectively. The aggregated data labels for the first three activity time steps ats are shown for the dynamic graph 600 of the play P2 in FIG. 6. Also, where there is no player action for a given edge at a given activity time step, and underscore "_" is shown. For example, the edge 605 shows the four edge data labels for player actions between offensive players b and a (i.e., b→a) as Pa,_,_,_, corresponding to a Pass (Pa) for ats=1 and an underscore "_" for "no player action" the for ats2,ats3,ats4, respectively. Also, an edge line 603 may be shown between offensive players a,d (i.e., a→d), even though there is no action between these two players and thus the edge label of "_,_,_,_ . . . " is shown in FIG. 6.

Figure 7:
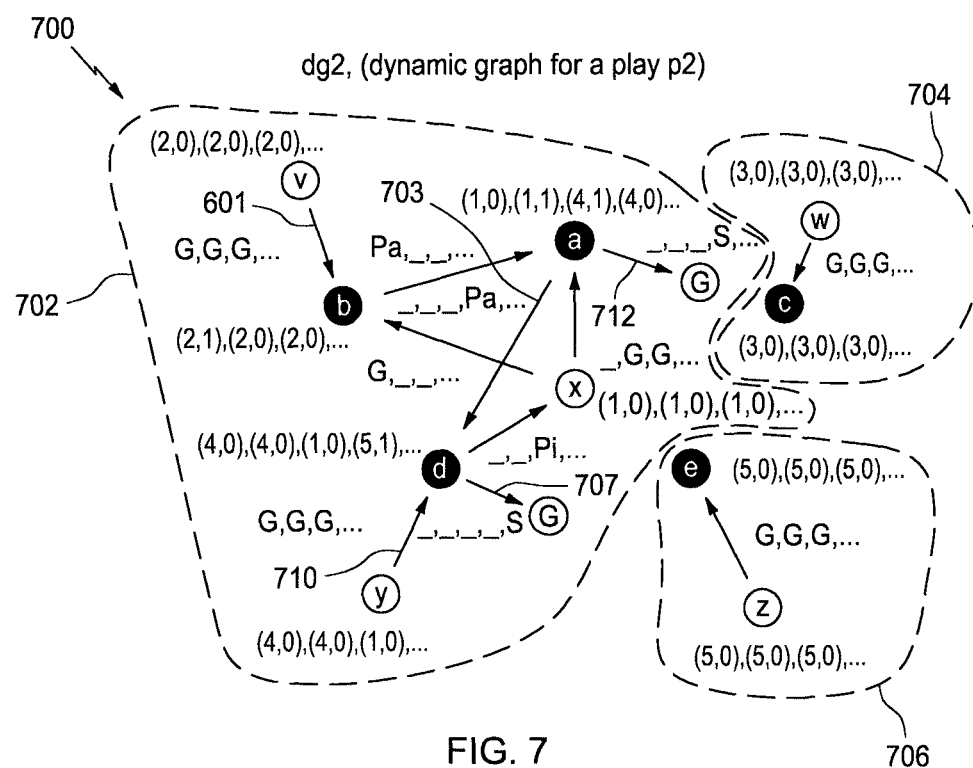
FIG. 7 is a diagram of a dynamic data graph for another play, in accordance with embodiments of the present disclosure.

Referring to FIG. 7, a dynamic graph dg2 700 for a play P2, e.g., a "pick and roll" play, is shown. The play P2 is similar to play P1 of FIGS. 4-6; however, in play P2, after the offensive player d sets the pick (Pi) on defender x, player d rolls off the pick towards the basket (G) and player a passes (Pa) the ball to player d (i.e., a→d), shown by the line 703, who receives the pass and takes a shot and scores, as indicated by a line 707 to node G (i.e., d→G), and the edge label would be _,_,_,_,S (where "S" is for the shot in the fifth activity time step ats5).

Figure 8:
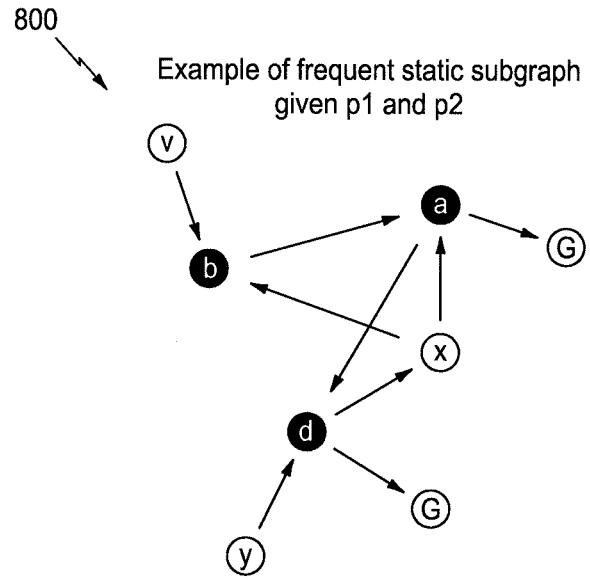
FIG. 8 is a diagram of a frequent static sub-graph of two plays, in accordance with embodiments of the present disclosure.

Referring to FIG. 8, once each of the plays of a game are represented by dynamic graphs (dg's), the logic may analyze the dynamic graphs for frequency, significance and compressibility to identify "frequent static sub-graphs" 800 for all (or a portion of) the plays in a game. For example, a "frequent" static sub-graph 800 is shown for plays P1 and P2 (FIGS. 6, 7) based on analysis of the dynamic graphs dg1,dg2 (600,700), respectively. More specifically, the dynamic graphs (dg's) for the plays of the game may be analyzed for "frequent" static sub-graphs, or portions of (or activities in) the dynamic graphs (or series of static graphs) that are repeated during a game at some minimum "frequency" or that are "significant", i.e., are an important or significant part of the play or play outcome, such as, a series of activities that lead to a score, or that involve multiple players with the ball, or that involve the ball, or that occur in a game just before or after a win is assured (e.g., "point of no return"), and the like. For example, in some embodiments, the present disclosure may give more weight (such as "Play Wt", in Table 900, FIG. 9) to "significant" sub-graphs based on play between average "point of no return" time based on previous games, and the current game's "point of no return" time (discussed more hereinafter).

The logic of the present disclosure may also use certain analysis techniques to help identify key events in a game that may have affected the game outcome, such as when the game has an "unexpected" outcome (e.g., determining the "unexpectedness" of the game outcome), or when the game was supposed to end (e.g., determine point in game when scoring margin usually yields a "point of no return" given the features of the team(s), but the other team wins).

The "unexpectedness" of game outcome may be computed by comparing the game outcome with a Bradley-Terry predictive model, which may determine the probability of one team beating another team based on the ability of each team, certain performance factors of each team (e.g., scoring percentage, turnover rate, and the like) and an error correction term, such as that described in the reference: "Categorical Data Analysis", Second Edition, Alan Agresti, 2002, ISBN: 0-471-36093-7, pp. 436-454, which is incorporated herein by reference to the extent needed to understand the present disclosure. Another approach to determining an unexpected game result or outcome may be to use the rankings of the teams playing (e.g., league rank or other form of ranking), and if the team with a significantly higher rank lost the game, the result or outcome would be considered an unexpected result (e.g., an "upset"). Any other game outcome model or modeling technique may be used if desired.

The average "point of no return" time in a game may be estimated using survivability analysis with proportional hazard models with time-dependent covariates, as shown by the equation:

$$\lambda_i(t, x_i(t)) = \lambda_0(t) * \exp\{x_i(t)'\beta\} \qquad \text{Eq. 1}$$

where $x_i(t)$ is a time-dependent covariates vector for team "i" at a time t; $\lambda_0(t)$ is the baseline hazard function for risk of teams with $x_i=0$, and $\exp\{x_i(t)'\beta\}$ is the relative risk associated with $x_i$. When the hazard function A is high (a large number), the survivability is low. If the asymptotic hazard function curve of hazard ($\lambda$) vs. time (t) is plotted, the curve becomes substantially horizontal or flat or small slope value (i.e., low survivability) when t gets large. For a given set of time-dependent covariates, an average "point of no return" may be determined, and that may be compared to the current game "point of no return" time. If the difference is greater than a predetermined threshold, the logic of the present disclosure may look for anomalous events (or may give more weight to events that occur) within this difference time window (or at any time after the average "point of no return" time), which may have caused this difference to occur, and thus may have affected the game outcome.

Time-dependent covariates may include features such as field goal percentage, offensive rebounds, turnovers, and "time played" by starter athletes in a game. Regression analysis and the "counting process" may be used to fit the survival model having time-dependent variables, such as is described in the references: SAS/STAT® 9.22 User's Guide—Overview: PHREG Procedure (support.sas.com/documentation/cdl/en/statug/63347/HTML/default/viewer.htm#statug_phreg_sect001.htm), "Cox's Regression Model Counting Process: A Large Sample Study," P. K. Anderson and R. D. Gill, Annals of Statistics, 1982, Vol. 10, No. 4, pp. 1100-1120, and "Your 'Survival' Guide To Using Time-Dependent Covariates," T. M. Powell and M. E. Bagnell, SAS Global Forum 2012, pp. 168-2012, which are each incorporated herein by reference to the extent needed to understand the present disclosure. Any other techniques for determining the "point of no return" time in a game may be used if desired. Other techniques may be used to determine if a given play (or activity pattern) in a game had an impact on game outcome or other significant attribute of the game.

Also, in general, identifying "significant" sub-graphs helps avoid considering (or filters out) data "noise" in strategies, i.e., graph data that does not have an important effect on the desired result. For example, in some embodiments, to avoid responding to data graph "noise", it may be desirable to avoid strategies or data graphs that consider an extremely small percentage of players on a given team, and also avoid strategies that don't involve at least one player having multiple possessions of the ball. Accordingly, in some embodiments, certain "significant" sub-graph factors may require a minimum percentage of players on a given team be used by the sub-graph, or a minimum number of ball possessions by at least one player in the sub-graph. Other "significant" sub-graph factors may be used if desired for selecting "significant" sub-graphs, and these significant sub-graph factors may be stored on the Highlight Rules Server 50 (FIG. 1).

The number of occurrences or repeat frequency in a game that determines if a sub-graph is "frequent" may be set by default or adjusted or learned over time by the system and methods of the present disclosure. For the present disclosure, "frequent" sub-graphs may represent entire plays or components of plays (sub-plays) that occur with some significant frequency (e.g., at least 5 times per game). The number of occurrences that represent "frequent" (or a frequency threshold) may be stored in the Highlight Rules Server 50 (FIG. 1) and may be set initially by default, e.g., 5 occurrences, and may be adjusted or learned over time by the adjustment logic or set or adjusted manually by a user. Techniques that may be used with the present disclosure for finding "frequent" sub-graphs within relationships are described in the references: "Frequent subgraph discovery in dynamic networks", B. Wackersreuther et al., MLG'10 Washington, D C, 2010, ACM 978-1-4503-0214-2, and "Substructure Discovery Using Minimum Description Length And Background Knowledge," Cook et al., Journal of Artificial Intelligence Research (JAIR), 1 (1994) pp 231-255, which are incorporated herein by reference to the extent necessary to understand the present disclosure. Other techniques may be used for finding frequent sub-graphs within relationships, if desired, provided they provide the functions and performance described herein.

In particular, in FIG. 8, to create the "frequent" static sub-graph 800, the dynamic graphs of the plays P1, P2 may be reviewed or compared or combined together and the graphs may be "compressed", e.g., certain nodes and edges may be removed as not relevant. For example, the dynamic graph 600 for the play P1 (FIG. 6) has a sub-graph 602 that was involved with having the ball and resulted in a score ("significant" event), i.e., the ball was held (or handled) by players b and a, and player a shot the ball, and players a, b were guarded by players v, x, and y, at various points in the play. Thus, each of these interactions are relevant for the frequent sub-graph 800 Whereas sub-graphs 604 (w⊖c) and 606 (z→e) were not connected to or involved with the sub-graph 602 and, thus, are less "significant" (or relevant or contributory) to the overall play P1 outcome. Similarly, for Play 2 of FIG. 7, the sub-graph 702 represents the most significant portion of the play (having the ball and a score), and sub-graphs 704 (w→c) and 706 (z→e) were not connected to or involved with the sub-graph 702 and, thus, are less "significant" (or relevant or contributory) to the overall play P2 outcome. Thus, sub-graphs 602,702 are significant and remain in the graph, whereas sub-graphs 604,606 in graph 600, and 704,706 in graph 700 are not significant and may be removed. Accordingly, the overall graphs 600,700 for plays P1,P2, respectively, can be "compressed" to the smaller "frequent" static sub-graph 800, having relevant nodes/edges that exist in both plays P1,P2 (i.e., are "frequent") or are relevant or significant to the plays. The amount of compression that is acceptable and retains the needed information may be set by default, or adjusted or learned over time by the system and methods of the present disclosure.

Referring to FIG. 9, a Graph-Based Substring Table 900 showing frequent static sub-graphs for a given team (e.g., Team A) and for a given game (e.g., Team A vs. Team D) in a table matrix format may be created using the node/edge substring (or "edge" substring) notation as discussed herein, which lists all the plays (or portions thereof), and the frequent static sub-graphs, such as the edges shown in the frequent sub-graph 800 (FIG. 8), that make-up the plays of the game.

In particular, the table 900 includes columns from left to right: Play # or Graph # (e.g., P1, P2, etc, or G1,G2 (for graph)), Node/Edges (i.e., Edge Substrings & Summary) a plurality of columns 908 corresponding to activity time steps (ats) associated with the play being graphed, including edge substrings for the static sub-graphs for plays, and an edge substring play summary for each of the activity time steps for the play, the number of columns may be different for each play, depending on the number of ats' in a play. Columns to the right of 908 include Game Time (at beginning of a play), Play Length, Score (at beginning of a play), DNP indication, # of repeats for this play in the game, and Play weighting factor (Play Wt). Other columns with data relating to the plays or data-graphs or sub-graphs, or substrings may be used to provide the functions described herein, if desired.

For a given play (or dynamic graph), the table 900 may have edge data or substrings for each frequent static sub-graph showing the players involved in the play in rows 910, and a play summary of the data graph at each activity time step (ats), in rows 912. The table 900 shows the data representation of the frequent static sub-graph 800 (FIG. 8) derived from the two dynamic graphs 600,700 of the two plays P1,P2 (or portions thereof) from FIGS. 6 and 7, respectively, as an example of two of the plays in a given game, as discussed herein with FIG. 8. Also, the goal node (G) may use an underscore ("_") for its data, as shown in the edge for a→G shown in rows 914,916 of the Table 900.

Also, in the play P2 of FIG. 7 ("pick & roll"), the player d receives a pass from player a in activity time step ats4, then in ats5 player d takes a shot (S) and scores (node G), as indicated by an edge line 707 from d to node G (i.e., d→G), and the edge label would be "_,_,_,_,S" with an "S" (for Shot) at the fifth activity time step ats5, not shown in the Table 900 FIG. 9 (which only shows ats1-ats4).

Also, the matrix and substring-based representations such as that shown in Table 900, e.g., encoding vertex (nodes) attributes (location, possession) with the edge definitions (player action), enables efficient sub-graph mining to identify "frequent dynamic patterns" from the data stored in the table 900, as discussed hereinafter.

Once each of the plays of a game are represented by "frequent" static sub-graphs stored in the Table 900 (FIG. 9), the frequent static sub-graphs for all (or a portion of) the plays in a game may be reviewed, compared, analyzed or mined to identify "frequent dynamic patterns" or "frequent normative patterns", or "dynamic normative patterns" (or DNPs) of activity for the game. The DNPs may then be used to identify activity patterns of the current game useful to determining game outcomes or key strategies (or other significant game attributes) and corresponding in-game highlight event clips (or segments) from the game (i.e., the one(s) to cut media highlights for), as discussed hereinafter.

Figure 10:
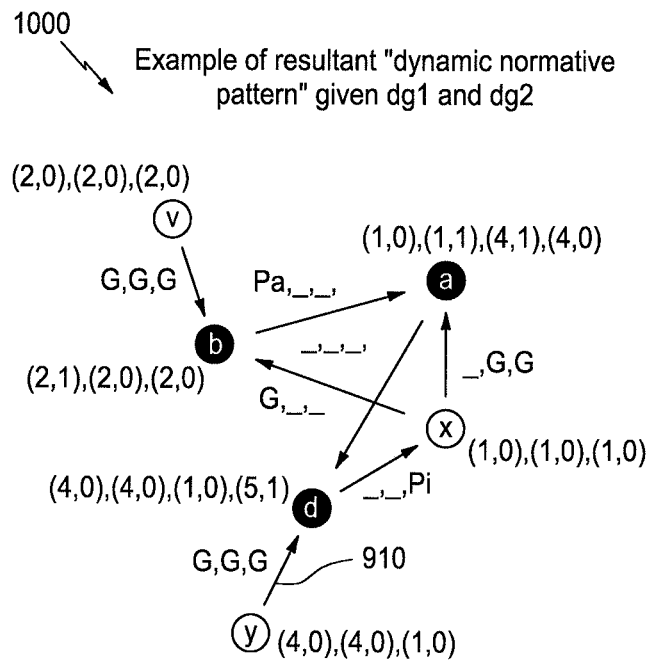
FIG. 10 is an example of a resultant dynamic normative pattern for certain plays in FIG. 9, in accordance with embodiments of the present disclosure.

Referring to FIGS. 9 and 10, the logic of the present disclosure may search the "frequent" static sub-graphs of Table 900 to identify "frequent dynamic patterns" or "dynamic normative patterns" (DNPs) within a game. For example, using the Table 900, the logic may compare the frequent static sub-graphs sg1 and sg2, for plays P1, P2, (or compare the sub-graph graph "edges") to identify common substrings (or common sub-graph edges) for activity time steps ats=1, 2, and 3, which would produce the results shown below:

Plays 1&2 edge comparison (common substring results):
<1:(2,0),(2,1),G; . . . ;(4,0),(4,0),G> (all edges common to ats4)
<2:(2,0),(2,0),G; . . . ;(4,0),(4,0),G> (all edges common to ats4)
<3:(2,0),(2,0),G; . . . ;(1,0),(1,0),G> (all edges common to ats4)
<4:(1,0),(1,0),_; (1,0),(2,0),_; (1,0),(1,0),G> (3 of 7 edges common to ats4).

The above common substring results for each activity time step ats may be determined by comparing the data for the same edges from two plays at a given ats, and if they match, the edge data is added to the common substring results, and if they do not match, it is not added to the common substring results. For example, for play P1 at ats1, the edge v→b (row 914) has a data value [(2,0),(2,0),G] and for play P2 at ast2, the edge v→b (row 916) also has a data value [(2,0),(2,0),G]. Thus, the edges are common for the activity time step ats1 and that edge may be added to the common substring results. This comparison process may be repeated for each of the edges shown in the Table 900 (FIG. 9) to create a common substring results data set for each activity time step (ats), such as is show above for ats1-ats4.

Thus, it can be seen above that the first three activity time steps ats1, ats2, ats3, each have "all common edges", meaning that the activities all match; however, the last activity time step ats4 has only three of seven edges in common; thus, confirming that the plays P1 and P2 are not exactly the same play. If all the edges had matched for all the activity time steps, the plays would be the same and the logic would indicate a repeated play pattern in column 910 of Table 900. The logic may indicate in a column 910 the number of repeats of a given play, which may be used to identify "frequent dynamic patterns" or "dynamic normative patterns" (DNPs) within a game. When a given play or activity sequence is repeated a predetermined number times, it may be identified as a DNP and indicated as such in column 912 in the Table 900. However, even if two plays are not exactly the same, they may be similar enough that they can be considered a DNP. For example, referring to FIG. 10, if the plays P1 and P2 (which are not the same but have many similar nodes/edges) were determined to be similar enough to represent a normative pattern in the game, the resultant dynamic normative pattern (DNP) would be as shown by a dynamic graph 1000 in FIG. 10. The amount (or number) of differences between plays to be considered similar or the "same" for highlights event selection purposes may be set by DNP rules (or In-Game Highlight rules or preferences or settings), such as now many differences between edges are allowed, which may be stored on the Highlights Rules Server 50 (FIG. 1). Also, the Plays may be weighted (or ranked), e.g., Play Wt, based on likely importance or significance to the game outcome (or other significant game attribute), as described herein, e.g., a play occurring after the average point-of-no-return time in a game may be given a high weighting (Play Wt) and may thus be given DNP status or otherwise added to the plays selected for the graph-based highlights (GBHs). Also, in some embodiments, the logic may prioritize identification of low ranked teams successful plays and a high ranked teams successful plays, to determine what critical plays or strategies were used to result in the game outcome, such as when there is an unexpected outcome, e.g., high rank team lost to a low ranked team.

In some embodiments, one technique that may be used with the present disclosure for detecting patterns within relationships to help identify DNPs is described in the reference: "Frequent subgraph discovery in dynamic networks", B. Wackersreuther et al., MLG'10 Washington, D C, 2010, ACM 978-1-4503-0214-2, which is incorporated herein by reference to the extent necessary to understand the present disclosure. Other techniques may be used to identify DNPs or for detecting patterns within relationships provided they provide the functions and performance described herein.

The node/edge (or "edge") substring data notation may also include other information, if desired, such as player label or team label or offense/defense or positions label. Other techniques may be used to represent the players, positions, and possession information in the data-graph and table/matrix format, if desired, provided the needed information about game play can be obtained, analyzed, compressed or simplified to achieve the results or functions described herein, including identifying patterns (e.g., normative or discriminative patterns) of game-play or activity. A generic data-graph format where a graph describes an entire game may look like: Game1: Graph1—activity time sequence format (Result=Win); Game2: Graph2—activity time sequence format (Win); Game3: Graph3—activity time sequence format (Loss).

Referring to FIG. 11, once the DNPs are identified for a given game, as shown in Table 900 (FIG. 9), the logic of the present disclosure may use the DNPs to identify sections (or segments) of the AV game media as graph-based Highlights (GBHs) for the game. In particular, the DNPs may be stored in a DNP table 1100 for that team (e.g., Team A) to help determine which DNPs for Team A contributed to, or are associated with or correlated to, Team A winning or losing games (i.e., having an affect on the game outcome for Team A). All the DNPs for that game may be stored in the DNP table 1100 or just DNPs associated with plays having a certain Play weighting factor (Play Wt), e.g., Play Wt greater than 3 on a scale of 1-5 where 5 is the highest association or relevance or significance for that game.

Thus, the DNPs may also be team specific, i.e., dynamic normative patterns associated with a particular team. In particular, the DNP Table 1100 may have columns 1102 with game/opponent attributes, such as Game #, Game Win/Loss, Opponent Team, Opponent Rank, and Year, and a series of columns 1104 where the DLP listing for Team A is provided for each game. Other game/opponent attributes (or factors) may be listed in the columns 1102, such as style-of-play, major roster changes (injuries, trades, etc.), game weather conditions (especially for football or other outdoor sports), or other attributes, conditions, or factors that may affect the game outcome (or other significant game attribute) or affect the ability to compare one game to another.

In the Table 1100 shown in FIG. 11, there are five (5) games populated in the table 1100. The first two games were Wins and the last three games were Losses. For each game there are a series of DNPs listed (e.g., DNP1-DNP14) that were identified when the games were analyzed. Dashed ovals show when a DNP appears in more than one game. The logic analyzes these patterns and determine which DNPs are indicative of or related to the outcome of the game. For example, DNP1 is common to Games 1 and 2, both of which were Wins, and DNP1 does not appear in any of the Losses, so DNP1 may be indicative of the outcome of the game. A similar conclusion can be reached for DNP3. However, DNP2 appears in Game 1 (Win) and Game 3 (Loss); thus no correlation can be drawn from this DNP regarding game outcome. In another example, DNP7 is in Games 3,4,5 all of which were Losses, and DNP7 does not appear in any of the Wins. In addition, the losses in Games 3 and 5 were to the same opponent (Team D), thus DNP7 has a stronger association with a Loss when Team A is playing Team D. The association may also be strong with DNPs against teams with a similar or close ranking to Team A (Rank=6), such as Team E (Rank=5). Ideally, DNPs should be based on data from previous games between the same teams (i.e., same opponent). However, if this is not available, e.g., because not enough data exists, then, for the team of focus, data involving an opposing team of similar play styles, similar ranks, and the like, may be used, as discussed herein. Also, the DNP table 1100 may span multiple years or seasons to provide the most data for analysis for a given team.

Also, DNPs with the same number (e.g., DNP1 in games 1 and 2) may be identical or may differ by a calculated or predetermined allowable amount that is small enough not to statistically matter to the outcome of the analysis. The amount of difference between two DNPs may be determined by calculating the number of graph edit operations it takes to change one DNP graph to the other DNP graph. The acceptable difference amount (or rules) between DNPs may be set by default and may be learned or adjusted over time by the present disclosure, and may vary based on the factors, such as the opponent team rank, or if it is the same opponent or a different opponent, or the Play weighting factors (Play Wt) associated with the DNP (in Table 900).

Another technique to identify DNP's or DNP strategies may be to collect all the DNPs in the DNP Table 1100 associated with losses (e.g., DNP space for Losses for Team A), and collect all the DNPs associated with wins (e.g., DNP space for Wins for Team A), and collect all the DNPs for the current game, and compare the current game DNP space (as a whole) to the DNP space for the game result (e.g., a Loss) and find DNPs with a comparatively small graph edit difference from DNPs from the corresponding space (e.g. from the Loss space). In that case, one comparison technique may be for DNPs from the current game to differ by no more than X amount of graph edit operations from y % of DNPs in games with the same outcome. Another example may be for DNPs from the current game whose graph edit operation differences with DNPs in games with the same game outcome fall within a given (small) interval of a "distribution" of differences. Another factor that may be used to weight a DNP is the number of times the DNP was repeated in a given game (as indicated in Table 9). Other techniques or algorithms for identifying DNP strategies that most likely accounted for or were associated with or correlated to a win or loss may be used if desired. In general, for DNPs or DNP strategies that most likely contributed to a win or loss, may be referred to herein as "critical strategies", which are detected by the present disclosure using the graph-based detection approach discussed herein.

Figure 12:
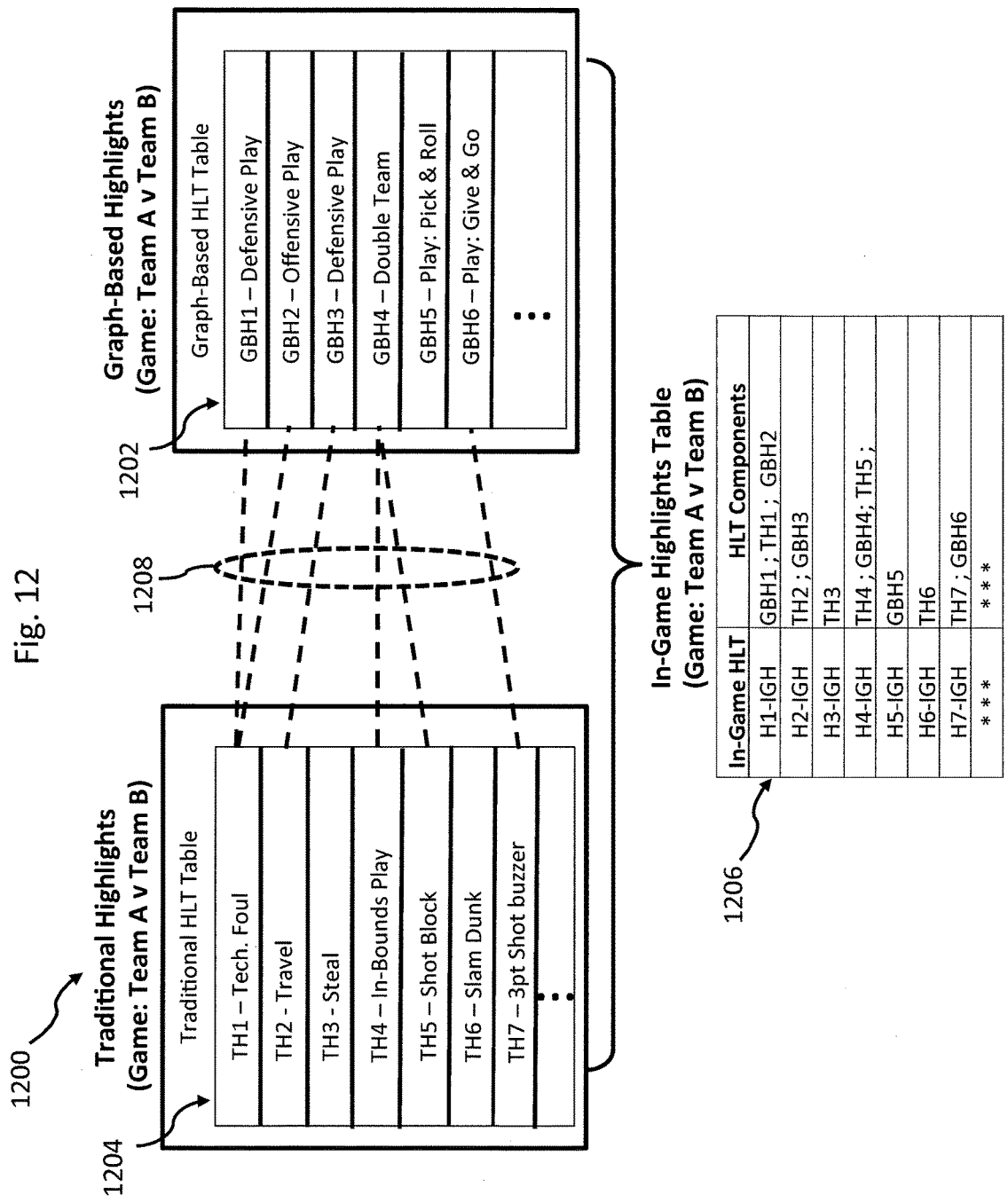
FIG. 12 is an illustration showing a traditional highlights table and a graph-based highlights table, and relationship to an In-Game highlights table, in accordance with embodiments of the present disclosure.

Referring to FIG. 12, after the DNPs have been selected that meets the criteria discussed herein above, the logic selects or identifies highlight event segments (i.e., Graph-Based Highlight or GBH) from the AV media input data associated with the selected DNP plays, based on the game time and length of play shown in FIG. 9, and is stored in a Graph-Based Highlight Table 1202 for this game (Team A vs. Team D), which may be located on the Highlight Components Server 54 (FIG. 1). In this example, there are GBH1-GBH6 graph-based highlights have been identified (in part of the table 1202). More specifically, BGH1 is a defensive play, BGH2 is an offensive play, BGH3 is a defensive play, BGH4 is a double team, BGH5 is a pick & roll play; BGH6 is a give & go play. The logic of the present disclosure may also generate narrative annotations such as phrases or augmented graphics describing the difference in plays, which may be used in the final AV highlights visualization or presentation.

In addition, there is a traditional highlights table 1204 where traditional highlights (TH1-TH7) for the current game are stored. The traditional highlights includes game highlights that are typically clipped or identified (or sourced) by traditional or existing or known means or techniques, such as crowd noise, social media hype, last minute score, record breaking play, and the like. Any known source for AV digital media game highlights clips may be used if desired for the "traditional" highlights or highlight clips, such as is described in the references: WO 2016/166764 A1, "System and Method for Creating and Distributing Multimedia Content", to Y. Barkai, LTD; US 2013/0268620, "Apparatus and Methods for Automated Highlight Reel Creation in a Content Delivery Network", to M. Osminer; and U.S. Pat. No. 6,976,031 B1, "System and Method for Automatically Generating a Narrative Report of an Event, Such as a Sporting Event", to Toupal et al, which are each incorporated herein by reference to the extent needed to understand the present disclosure.

In this example, the traditional highlights or highlight clips THs may include, e.g., TH1—Technical Foul, TH2—Travel, TH3—Steal, TH4—In-bounds play; TH5—Shot block; TH6—Slam Dunk; TH7—3 pt Shot at Buzzer, together with the game time of the highlight and a link to the traditional highlight clip are provided in the Traditional Highlights Table 1204.

The logic next determines whether there are any correlations between the Traditional Highlights and the Graph-Based Highlights, such as proximity in time, e.g., occurring a short time (e.g., less than 10 seconds on game clock) before or after each other, other correlation times may be used if desired. For example, the Traditional Highlight TH1—Technical Foul (on Team A), may have occurred just after a strong defensive play (GBH1) by Team A (where Team A fouled Team D) and, after the Technical Foul was over, Team A made a offensive play (GBH2) (where Team A failed to score), both graph-based highlight plays (GBH1, GBH2) likely had an impact on the outcome of the game (e.g., a Loss by Team A), or help tell (or narrate) the story about the how the technical foul game about (defensive play), and how Team A had trouble recovering from the technical foul (failure to score). Also, the graph-based highlight plays (GBH1, GBH2) were selected to be in the GB Highlights table (FIG. 12), because they were part of a dynamic normative pattern (DNP) of Team A from other lost games (or due to other play weighting factors), as discussed herein.

Thus, an In-Game Highlight H1-IGH may be the combination of these highlight segments, e.g., the Defensive Play segment (GB1), followed by the Technical Foul segment (TH1), followed by the Offensive Play segment (GB2). Similarly, an unusual travel call on Team A, (TH2—Travel), which was caused by a Defensive Play of Team B (GBH3), may be combined into In-Game Highlight H2-IGH for the In-Game Highlights Table 1206, where the travel (TH2) is shown followed by the Defensive Play (GBH3). For the next traditional highlight TH3 there may not be any corresponding Graph-Based Highlight, and it may be added by itself as H3-IGH to the In-Game Highlights Table 1206. The logic may identify when there is only a traditional highlight and decide whether to leave it in the table based on the Highlight Rules. Conversely, there may be two Traditional Highlights (TH4,TH5) that correspond to a single Graph-Based Highlight (GBH4). In that case, a spectacular in-bounds play by Team A (TH4), led to a blocked shot by Team B (TH5), which was caused by a double team defensive play set-up by Team B (GBH4). In that case, the highlights may be combined into In-Game Highlight H4-IGH for the In-Game Highlights Table 1206, where the In-Bounds Play (TH4) is followed by the Double Team Play (GBH4), which is followed by the Shot Block (TH5). Also, the Graph-Based Highlight may put into the In-Game Highlights on its own if there are no traditional highlights, such as GBH5, where Team A executes a pick & roll but misses the shot at a key point in the game. In another example, the traditional highlights have a 3-point shot at the buzzer (TH7) that is missed by Team A that would have tied the game (and sent it to overtime), which was set up by a give and go play by Team A), which may be combined into In-Game Highlight H6-IGH for the In-Game Highlights Table 1206, where the give & go play (GBH6) is shown followed by the missed 3 pt shot at the buzzer (TH7). The resulting In-Game Highlights Table 1206 is stored in the Highlights Components Server 54 (FIG. 1).

Figure 13:
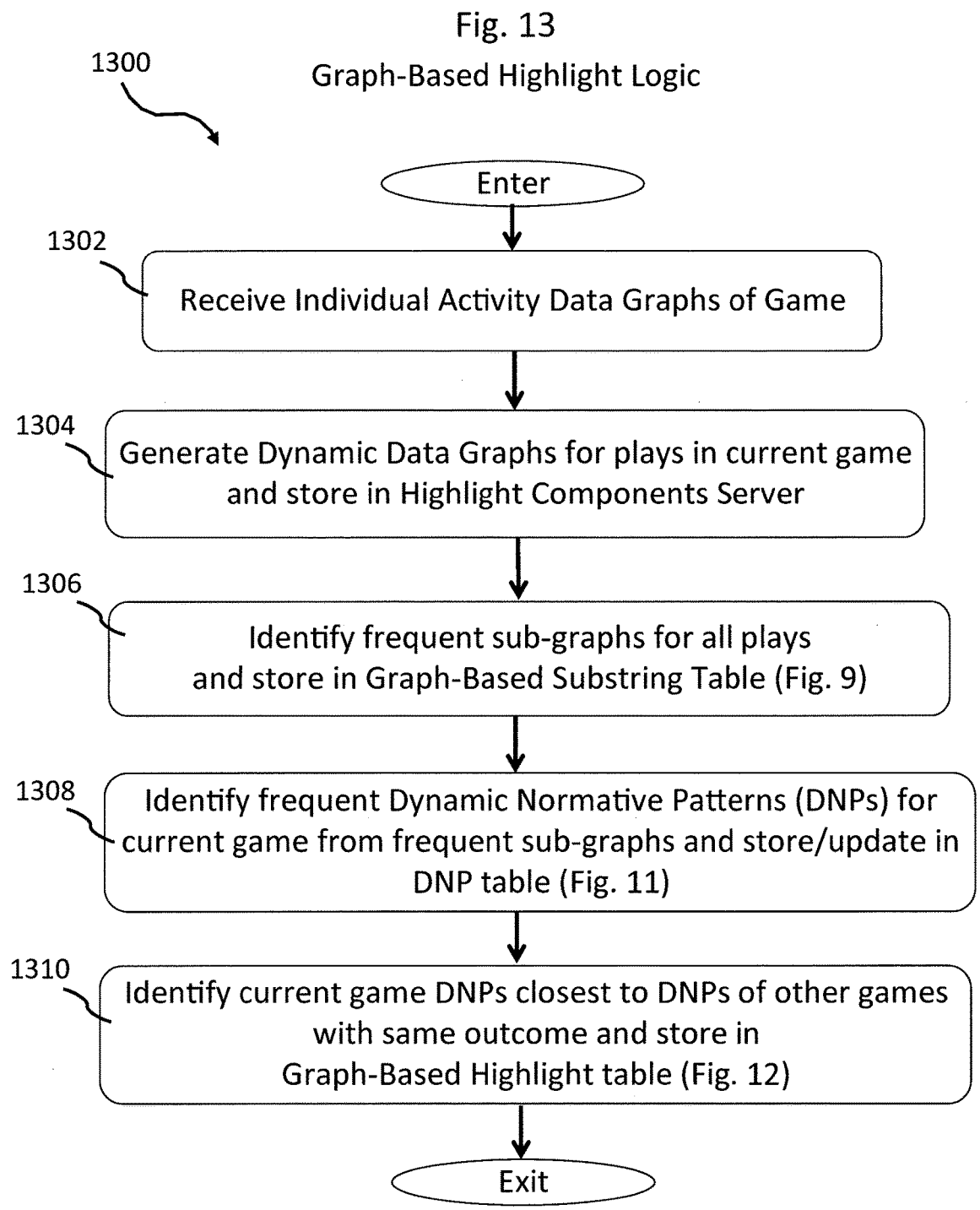
FIG. 13 is a flow diagram of a portion of one of the components of FIG. 1 for graph-based highlight logic, in accordance with embodiments of the present disclosure.

Referring to FIG. 13, a flow diagram 1300 illustrates one embodiment of a process or logic for implementing graph-based highlight logic, which may be implemented by or part of the In-Game Highlights Logic 42 (FIG. 1). The process/logic 1300 begins at block 1302 by retrieving individual activity data graphs (or static graphs) for the current game from the Graph Server 52 (FIG. 1). The data stored on the graph server may be in the format discussed herein for processing by the logic of the present disclosure. For example, the raw static data-graph input data may be in a digital format, equivalent to that shown in the static graphs 502-508 shown in FIG. 5 or 6 with the edges and activity time steps ats, similar that shown in Table 900 (FIG. 9), for each of the plays of the game, together with the game metadata. Alternatively, the systems and methods of the present disclosure may have raw graphing data logic (not shown), which may be located on the Graph Server 52, that creates the raw graph input data to be used by the auto-highlight generation logic 12. In that case, the raw graphing data logic may process the AV game data and transform it into the data-graph model format discussed herein (e.g., with node and edge labels), which may include applying computer vision to detect the position of players on the court (or field of play), parsing player tracking data to detect position of the player and the ball, and parsing play-by-play data (and metadata) to identify the plays. Any other techniques may be used if desired to obtain the raw static data graph data of the game.

Also, the decisions required to create the data graph model of the present disclosure to represent plays in a game may differ from sport to sport (and possibly from league to league). Even within a given sport, different types of play or players (e.g., male/female, pro/non-pro, US/Non-US, and the like) may require different data models as the rules may be different. While it is not practical to list all possible graph data models, it should be understood by one skilled in the art how to adapt the teachings herein to other sports and rules.

Regarding other sports, a similar data graph strategy may be used for games like soccer, football, hockey, baseball, lacrosse, field hockey, or any other team sport. For a game like soccer and football, there will be more nodes, e.g., there may be one node for each player, such as 22 nodes for 22 players for soccer and football, 12 nodes for 12 players for hockey, and the like. For sports where there are goals, there may also be two additional nodes for each goal (e.g., one for a scored Goal and one for a Missed shot on goal, like in the basketball example described herein above). Also, similar to the basketball example described above, the field may be divided into regions or zones or blocks to make a grid, each region having a number associated with it. For example, if the soccer field is 20 "blocks" long and 10 "blocks" wide, there would be 200 blocks or regions or zones or squares, on the field, e.g., with grid numbers #1 to #200. In addition, every node may have a label associated with it, such as: <PlayerID, Position, Region, Possession>. For example, <"Lionel Messi", "Forward", 78, 1>, indicates that Messi is in region #78 with the ball. Other formats may be used if desired to represent the data graph format for various sports.

Also, in the basketball example described herein above, only one half of the basketball court was shown for illustration of two plays. To have a complete data-graph for a basketball game, the grid may cover the whole basketball court. Thus, in that case, there may be 12 regions or zones, and two goals or baskets (G1, G2). Other number of regions on the court may be used if desired, depending on the amount of location precision (or granularity) desired, e.g., there may be only 3 regions per half, which would provide half of the position location granularity or there may be 12 regions per half, which would provide for double position location granularity. Alternatively, the location of each player on the field or court may be defined by latitude and longitude coordinates, if desired.

After the static data graphs are received for the current game at block 1302, block 1304 generated dynamic data graphs for plays in current game and store in the Highlight Components Server 54 (FIG. 1). Next, a block 1306 identifies frequent static sub-graphs as described herein for all plays and stores the sub-graphs in the Graph-based Sub-String Table 900 (FIG. 9) in the data edge format described herein. The block 1306 also stores the game time, play length, score and Play weighting in Table 9. The play weighting factor (Play Wt) is an indication of the significance to the outcome of the play or game (or other significant attribute of the game), and may range from 1 to 5, 1 being lowest significance and 5 being the highest significance, as discussed herein. In FIG. 9, Play P1 is shown as being high significance (Play Wt=5), and Play P2 is shown as being much lower significance (Play Wt=2). These weighting factors may be taken into account when determining which plays are selected as DNPs and which are selected to be in the highlights components or in the final highlights AV media content (or video).

Play Wt may be used to indicate, or be set or adjusted based on, the level of impact, or the likelihood of impact on the game outcome, or on other significant attribute of the game (such as record breaking play, key defensive stop, key strategy, and the like). The value of the Play Wt may be based on multiple elements or effects factored together. Also, multiple different weighting factors (not shown) may be used for a given play, if desired, corresponding to different elements or effects, which may influence (individually or together) how a given play gets used in highlights or how it gets assessed as a DNP. Any data-graph-based technique may be used to identify DNPs, if desired, provided it provides the functions and performance described herein.

Next, a block 1308 identifies frequent Dynamic Normal Patterns (DNPs) for the current game from the frequent sub-graphs and Play weighting factors (Play Wt) and stores in the DNP Table 1100 (FIG. 11), as discussed herein. Next, a block 1310 identifies current game DNPs closest to DNPs of other games with the same outcome and stores the results in the Graph-Based Highlights Table 1202 (FIG. 12), as discussed herein. For example, referring to FIG. 11 and Table 1100, if this game was Game 5 of the 2017 season, the game ended in a Loss for Team A, it was against opponent Team D, which it played before in Game 3 (shown by dashed lines), Team D having a Rank of 6$^{th}$ in the league, and the DNPs identified were DNP7, DNP12, DNP13, and DNP14. The only DNP that appeared in a previous game was DNP7, which also appeared in Game 4 (against Team E) and Game 3 (against Team D). This is particularly relevant because it was against the same opponent (Team D), as discussed herein with FIG. 11. Next, a block 1312 compares Traditional Highlights in the Traditional Highlights table 1204 with the Graph-Based Highlights in the Graph-Based Highlights Table 1202, to generate the In-Game Highlights and store in the In-Game Highlight Table 1206, as described herein.

Figure 14:
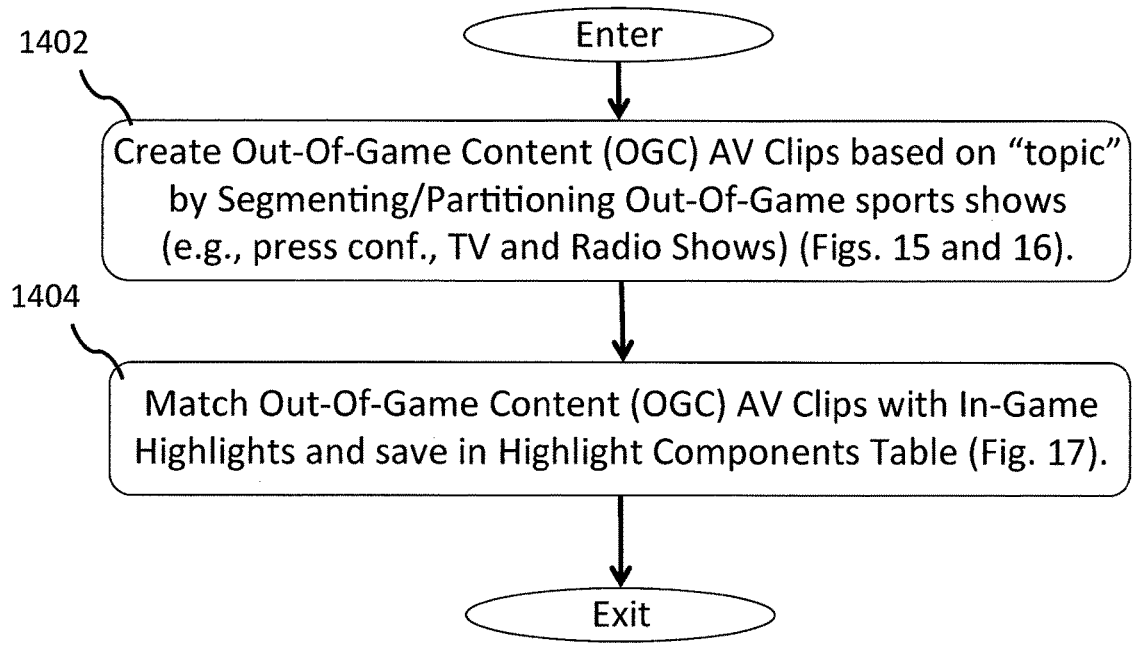
FIG. 14 is a flow diagram of a portion of one of the components of FIG. 1, in accordance with embodiments of the present disclosure.

Referring to FIG. 14, a flow diagram 1400 illustrates one embodiment of a process or logic for implementing Out-of-Game Content (OGC) Logic 44, which may be implemented by or part of the Auto-Highlights Generation Logic 12 (FIG. 1). The process/logic 1400 begins at block 1402 by creating (or generating) "Out-of-Game" Content Clips (or AGC Clips) based on "topic" of the clip by segmenting or partitioning the AV content of out-of-game shows, such as post game press conferences, post-game and in-game TV and radio sports shows that provide commentary or analysis of the game (or of the game so far, e.g., half time reports), such as is described in more detail with FIGS. 15 and 16, discussed hereinafter. After the OCG Clips have been generated and stored in the table 1604, a block 1404 matches the OGC Clips with the In-Game Highlights (or identifies which of the OGC Clips most closely relates to each of the In-Game Highlights) and saves the results in the Highlights Components Table, as discussed more hereinafter with FIG. 17.

Figure 15:
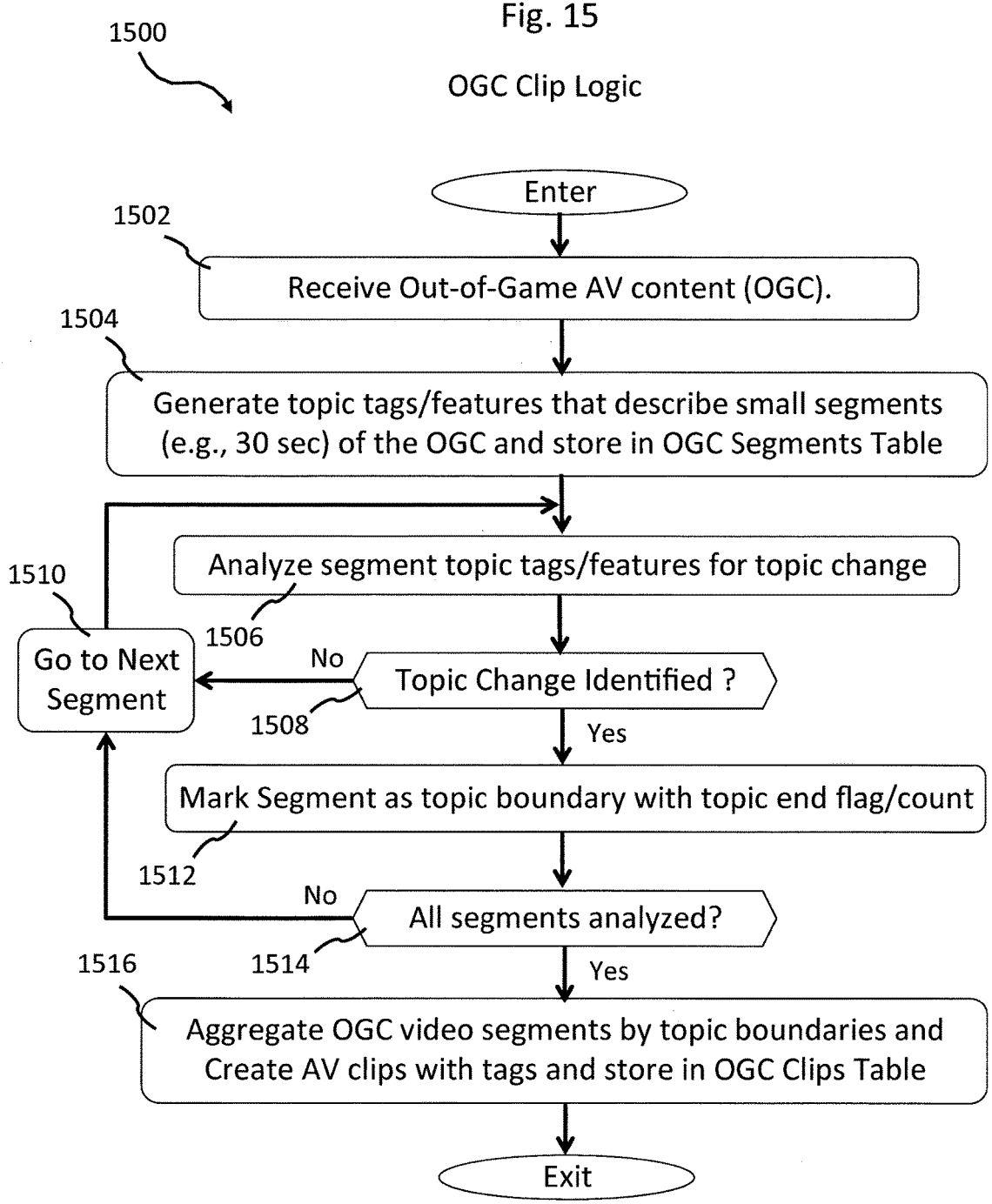
FIG. 15 is a flow diagram of a portion of one of the components of FIG. 1, in accordance with embodiments of the present disclosure.
Figure 16:
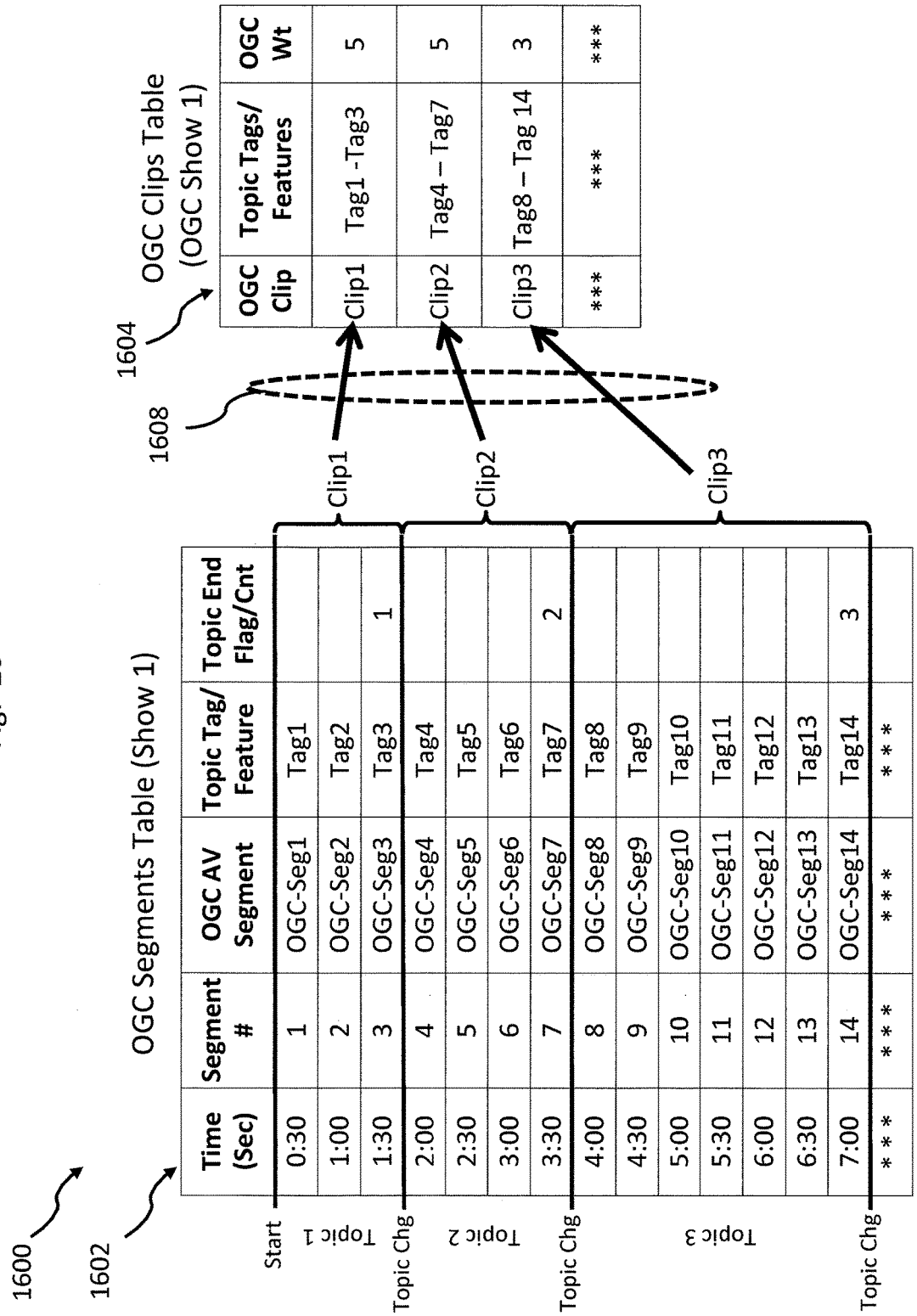
FIG. 16 is a diagram showing a relationship between an OGC Segments Table and an OGC Clips table, in accordance with embodiments of the present disclosure.

Referring to FIGS. 15 and 16, a flow diagram 1500 (FIG. 15) and a table-based diagram 1600 (FIG. 16) illustrate one embodiment of a process or logic for implementing at least a portion of the Out-of-Game Content (OGC) Clip Logic, which may be implemented by or as part of the OGC Logic 44. The process/logic 1500 begins at block 1502 by receiving the AV media for "Out-of-Game" Content (OGC) from out-of-game sources (or OGC Shows) 24 (FIG. 1), such as post-game press conferences, interviews, post-game and in-game TV and radio sports shows that provide commentary or analysis of the completed game (or of a game in progress, e.g., halftime reports), or any other sports-related show other than the in-game live (or pre-recorded live) content (or footage) itself and the corresponding real-time (or concurrent) commentating of the game. The process/logic 1500 (FIG. 15) begins at block 1502 by creating (or generating) tags or features that describe small segments, or sub-segments (e.g., 30 seconds) of the AGC for each sports show, and storing them in an SGC Segments (or Sub-Segments) Table 1602 (FIG. 16) based on "topic" of the AV clip (or segment) by segmenting or partitioning the AV media content of the out-of-game shows. The term "sub-segment" may be used herein when referring to the small segments used for OGC segmentation or partitioning, to distinguish from the larger topic segments (or clips) or highlight segments (or clips) discussed herein.

Next, at block 1504, the logic generates a sequence of tags or features from the small AV segments, or sub-segments (e.g., 30 seconds) of the OGC. Other segment (or sub-segment) time lengths may be used if desired. The logic 1500 uses tagging and topic modeling techniques to generate tags or feature-sets (or features) for each of the segments or sub-segments (SGC-Segments), from closed captions, video understanding techniques to generate brief descriptions from the video segment, and audio understanding techniques to analyze speaker changes and pauses, and stores the results as tags/features or tags/feature-sets in the OGC Segment Table 1602 (FIG. 16).

Referring to FIG. 16, the OGC Segments (or Sub-Segments) Table 1602 may have columns such as Time (sec) for each of the AV media time segments, a segment (or sub-segment) number for each AV segment, the OGC video segment itself (OGC-Seg1 to OGC-Seg-n) or a link or pointer thereto, the topic tag/features (or tag/feature set) for each video segment (e.g., Tag/Feature_Set_1-Tag/Feature_Set_n), which may be shown or referred to herein as "Tag/Feature", "Tags/Features", "Tag" or "Tags, and a Topic End Flag and Count (1,2, ... n), which indicates the segment (or sub-segment) where a change in topic is identified. The tags/features may be streamed in batches and the batch boundaries are tested to determine if they form "topic boundaries." When the logic 1500 (FIG. 15) identifies a topic change, a sequential number is placed in the Topic/End Flag/Count column in Table 1602 for the corresponding OGC segment. In particular, block 1506 analyzes segment topic tags/features for a change in topic. Next, a block 1508, determines whether a topic change has been detected. If not, a block 1510 goes to the next AV segment in the segment table and the block 1506 analyzes the next segment as described above. If the result of block 1508 is YES, a topic change has been identified in the segment and a step 1512 marks that segment in the OGC Segments Table 1602 (FIG. 16), in the Topic End Flag/Count column for that, indicating a topic boundary. Next, a block 1514 determines if all the segments in the table have been analyzed. If not, the block 1510 goes to the next OGC AV segment in the OGC Segments Table 1602 and the block 1506 analyzes the segment as described above. If the result of block 1514 is YES, all the segments for a given OGC show have been reviewed, and a block 1516 aggregates (or collects) the video segments by topic boundaries and creates video clips with tags/features discussed herein above and stores them in an OGC Clips Table 1604 (FIG. 16).

Referring to FIG. 16, for example, the OGC Segments Table 1602 shows a series of OGC video segments from an OGC sports show (Show1), having AV segments (or sub-segments) every 30 seconds (Time column). In that case, the first topic change is detected in Segment #3 (AV segment OGC-Seg3), and the logic 1500 puts a "1" (indicative of the end of the first topic) in the Topic End Flag/Count column for the Segment #3 row and the segment analysis continues to the next OGC AV segment. Similarly, if the logic 1500 detects another topic change in Segment #7 (AV segment OCG-Seg7), and the logic 1500 puts a "2" (indicative of the end of the second topic) in the Topic End Flag/Count column for the Segment #7 row and the segment analysis continues to the next AV segment. If the logic 1500 detects another topic change in Segment #14, the AV segment OCG-Seg14, and the logic 1500 puts a "3" (indicative of the end of the third topic) in the Topic End Flag/Count column for the Segment #14 row and the segment analysis continues to the next segment as described herein above.

The topic of an AV segment may be determined (or obtained) using topic modeling analysis software on the OGC AV content sources data, such as Gensim or an algorithm using, e.g., Latent Dirichlet Allocation (LDA) topic modeling on the OGC content, which may be run on the highlight rules server 50 (FIG. 1). The text equivalent of the OGC segment may be provided to the server running the models, which may provide the topic results (e.g., a list of topics or topics vector) for the segment (or batch of segments) being reviewed. In some embodiments, the topic may be obtained by using natural language processing algorithms and software on the OGC content, such as Natural Language Toolkit (NLTK) library, or SciKit-Learn machine learning software, which may also be run on the highlight rules server 50. Other techniques may be used if desired to provide the topic information of a given AV segment. To assist in topic identification, the logic may also use data from the language and topic sources 28.

In some embodiments, the segmentation (or partitioning) approach or technique of the present disclosure may comprise an ensemble of sliding adjacent windows to measure the similarity of candidate segments at different time scales to identify the topic boundaries. Such a technique ensures that small digressions in discussion are not identified as segment topic breaks (or changes), and provides a framework for inclusion of features drawn from video, audio, and text (such as closed caption). Such an ensemble technique also allows for calculation of a "confidence score" for the segment boundary to determine the confidence that the topic boundary is correct, as discussed further below.

More specifically, the topic segment boundaries may be determined using two adjacent sliding windows and the Jaccard Similarity index. The Jaccard Similarity index, as is known, is a ratio of the Intersection over the Union of two sets. In this case, the logic may create two sliding windows of a predetermined size, representing the two sets. The first window containing the batches of segments before the topic boundaries have been tested, and the second window containing the batches after the boundaries have been identified. The logic may calculate the Jaccard Similarity index between the two windows (Intersection of two windows over Union of two windows) and determine if the index is greater than a predetermined Similarity Threshold. If it is, a Similarity Vote counter (SimilarityVote) is incremented by one, and a Window counter (NumWindows) is incremented by one. If the index is not greater than the Similarity Threshold, the Similarity Vote counter is not incremented, but a window counter is still incremented by one. Then the logic determines if the window size has reached a predetermined maximum window size. If not, the window size is increased by a multiple of the OGC AV segment (OGC-Seg) size and the logic returns to creating the two sliding windows discussed above and repeats the process described above. This process may be performed sequentially, or in parallel where windows of multiple sizes are tested at the same time using a distributed (or parallel) computing framework. If the maximum window size has been reached, a Confidence factor may be calculated by comparing the SimilarityVote to the total number of windows NumWindows: (SimilarityVote/NumWindows)*100. If the Confidence factor is greater than a predetermined Confidence Threshold, then a change point has been detected, i.e., a topic change has occurred. In that case, the logic would place a number in the corresponding Topic End Flag/Count column in the OGC Segments Table 1602. Next, the logic would repeat the above until the end of the stream of segments has been reached for a given OGC show.

Textual features for "similarity" calculations may include Named Entities (e.g., team names, player names, and the like) and Keywords/Topics (e.g., score, block, steal, turnover, technical foul, key defensive play, key offensive play, 3-point buzzer shot, slam dunk, in-bounds play, give and go play, pick and roll play, double team, and the like), instead of simply words/terms found in text. Also, the segmentation approach described herein works well in a streaming video environment and may also be used for real-time topic segmentation of AV content. Accordingly, the above approach provides a multi-length temporal sliding window analysis of speech and closed caption data for a clean extraction of relevant game commentary.

In some embodiments, the logic may perform topic segmentation or partitioning on a plurality of the desired OCG shows at one time (identifying each by its show name or unique number), before performing OGC clip creation. Any other technique for identifying the OGC topic segments may be used if desired, provided they provide the topic boundaries and usable to create the OGC clips described herein.

Referring to FIG. 16, once all the topic boundaries have been identified for a given OGC show, the logic 1500 collects (or aggregates or assembles or concatenates) the segments (or sub-segments) for use in a Clip together with their associated tags/features and stored in an OGC Clips Table 1604. For example, in FIG. 16, as shown by lines 1608, OGC Clip1 is created from OGC-Seg1 to OGC-Seg3 (corresponding to Topic 1) along with the Tags/Features (Tag1-Tag3) and stored as a row in the OGC Clips Table 1604, OGC Clip2 is created from OGC-Seg4 to OGC-Seg7 (corresponding to Topic 2) along with the Tags/Features (Tag4-Tag7) and stored as a row in the OGC Clips Table 1604, and OGC Clip3 is created from OGC-Seg8 to OGC-Seg14 (corresponding to Topic 3) along with the Tags/Features (Tag8-Tag14) and stored as a row in the OGC Clips Table 1604.

Figure 17:
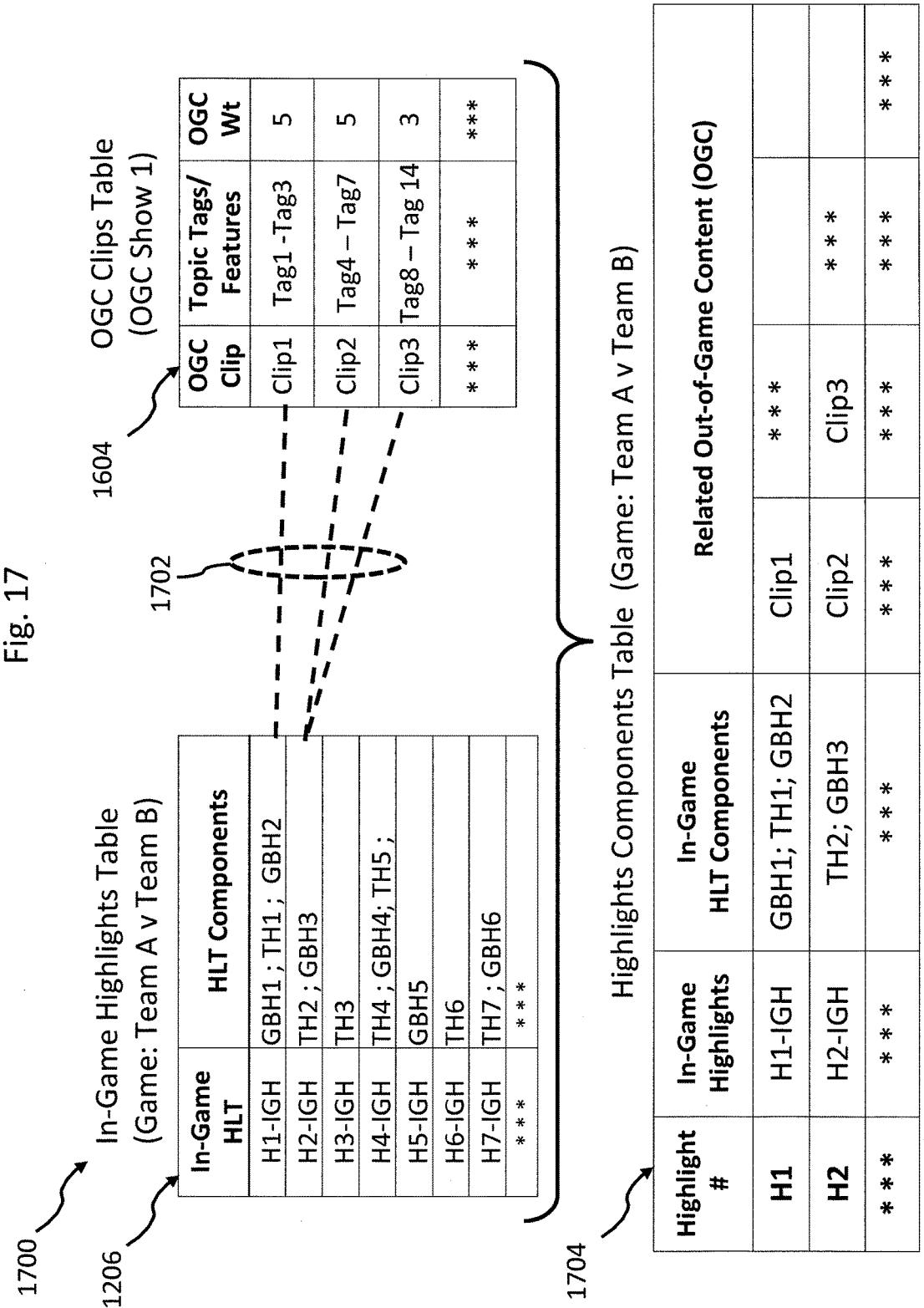
FIG. 17 is a diagram showing a relationship between an In-Game Highlight s Table and an OGC Clips table and a Highlights Components Table, in accordance with embodiments of the present disclosure.

Referring to FIGS. 14 and 17, once the OGC Clips are created for all the desired OGC shows, the clips are matched to the In-Game Highlights as described in block 1404 (FIG. 14) of the OGC Logic. In particular, in FIG. 17, the logic compares the Topic Tag/Features for each clip against the descriptions of the HLT Components, such as is shown in the Traditional Highlight Table 1204 and the Graph-Based Highlights Table 1202 of FIG. 12. When there is a OGC Clip from an OGC show that matches (or substantially matches) the In-Game Highlight, the corresponding OGC Clip is stored in the Highlights Components Table 1704 for the current game. In addition, in the OGC Clips Table 1604, each OGC Clip may be assigned a weight or weighting factor ("OGC Wt" column), which may be used to prioritize or rank or weigh the relevance (or relatedness) of each of the OGC clips to the corresponding highlights. The OGC weighting (OGC Wt) may range from 1 to 5, 1 being lowest relevance (or significance) and 5 being the highest relevance (or significance), as discussed herein. These OGC weighting factors may be taken into account when determining which OGC Clips are selected to be in the highlights components or in the final highlights video. Also, the OGC Wt weightings and tags/features may stay with the Clip when stored in the Highlights Components Table.

For example, in FIG. 17, as shown by lines 1702, OGC Clip1 is found to match In-Game Highlight H1-IGH (and its OGC weighting is 5—strong relevance/relatedness), and it is added to the Table 1704 for the H1 (Highlight #1) row. Similarly, OGC Clip2 and OGC Clip3 are found to match In-Game Highlight H2-IGH, having OGC weightings of 5 (strong relevance) and 3 (middle relevance), respectively, and they are added to the Table 1704 for the H2 (Highlight #2) row. This matching (and weighting) process continues for each of the OGC sports shows within a predetermined timeframe or post-game review (or sample) period after the game ends (Post-Game OGC Sample time—see HLT App settings).

Figure 18:
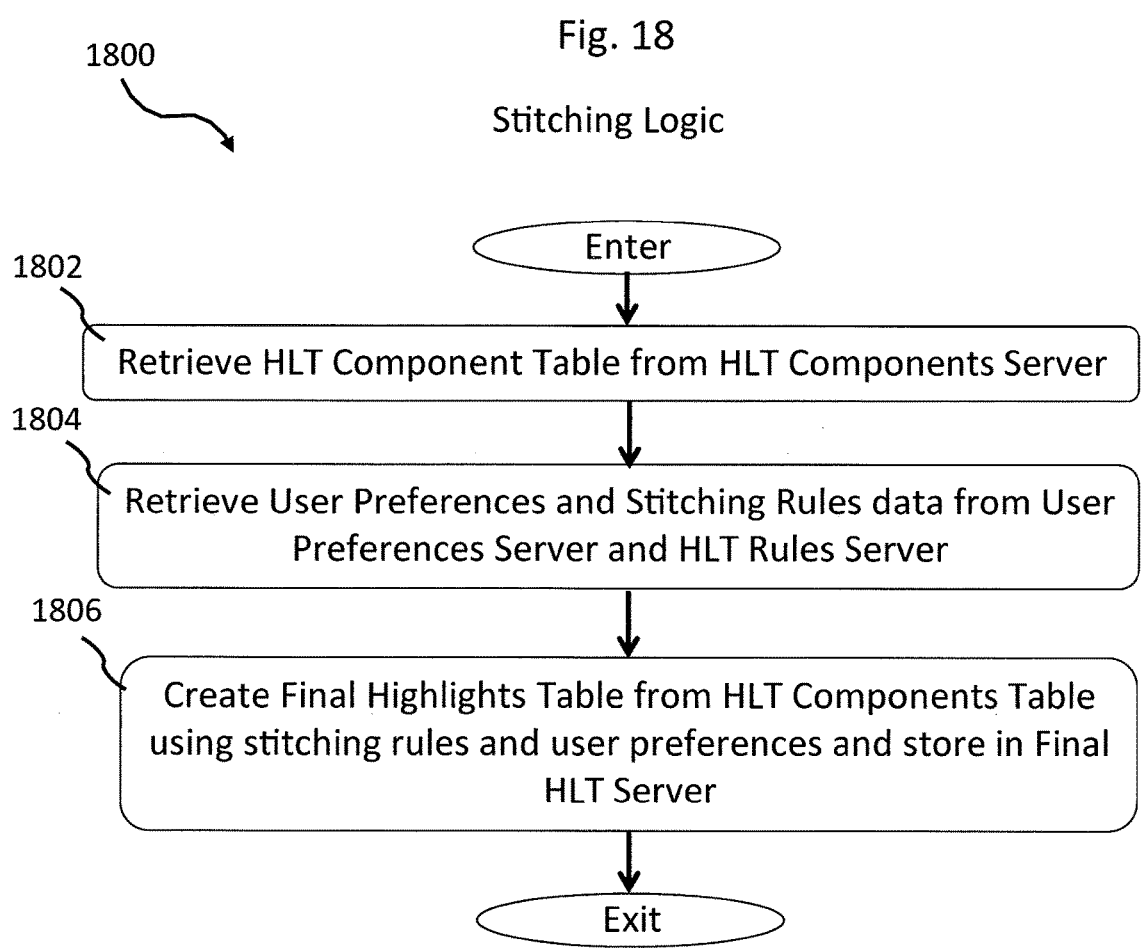
FIG. 18 is a flow diagram of a portion of one of the components of FIG. 1, in accordance with embodiments of the present disclosure.

Referring to FIG. 18, a flow diagram 1800 illustrates one embodiment of a process or logic for implementing the Stitching Logic 46 (FIG. 1), which may be implemented by or part of the Auto-Highlights Generation Logic 12 (FIG. 1). The process/logic 1800 begins at block 1802 by retrieving the HLT Components Table 1704 (FIG. 17) from the HLT Components Server 54. Next, a block 1804 retrieves user preferences, weighting factors, and stitching rules data from the User Preferences Server 62 and HLT Rules Server 50. Next, a block 1806 creates a Final Highlights Table 2100 (FIG. 21) from the HLT Components Table 1704 (FIG. 17) using the stitching rules, weighting factors, and user preferences, and stores the resulting Final Highlights Table in the Final HLT Server 60. In particular, the block 1806 may select the highlights (H1-Hn) from the HLT Components Table 1704 (FIG. 17) that have In-Game Highlights (IGHs) having plays with the highest weighting factors (Play Wt), or having an Play Wt value greater than a predetermined acceptable Play Wt threshold. Once the highlights (H1-Hn) have been chosen, the logic may select the OGC Clips having the highest weighting factors (OGC Wt), or having an OGC Wt value greater than a predetermined acceptable OGC Wt threshold. The Play Wt and OGC Wt thresholds may be set in the HLT App settings, set by default, or adjusted or learned over time (by the Adjustment Logic 48), to provide the desired highlight viewing experience. The block also filters or selects the final HLT components based on the settings for the OGC sample time window, OGC sports shows, OGC sports commentators, OGC types, max OGC clips, and the like, per the HLT App Settings user preferences.

The final highlights AV media package (of video) in the Final Highlights Table may be unique for each user, based on the user preferences, to provide the desired user highlight viewing experience. In addition, for final highlights AV media content that are being broadcast to a viewing audience, such as on TV or an "on-line" internet-based broadcast (received by or accessible to the general public), the HLT Producer (as the user 40, FIG. 23) may input separate settings for the final highlights AV media content package to be broadcast. The HLT Producer can adjust any the parameters discussed herein through the HLT App.

Also, the Adjustment Logic 48 (FIG. 1) may learn over time and make adjustments (or suggestions) to the settings, use of weighting factors, rules and the like, based on the feedback data received by the Adjustment Logic 48 from the general public, e.g., from social media and the like, regarding the selection of the In-Game Highlights, OGC Content, Final Highlights Table, and the display or presentation (or visualization) of the Final Highlights AV media content.

Figure 22:
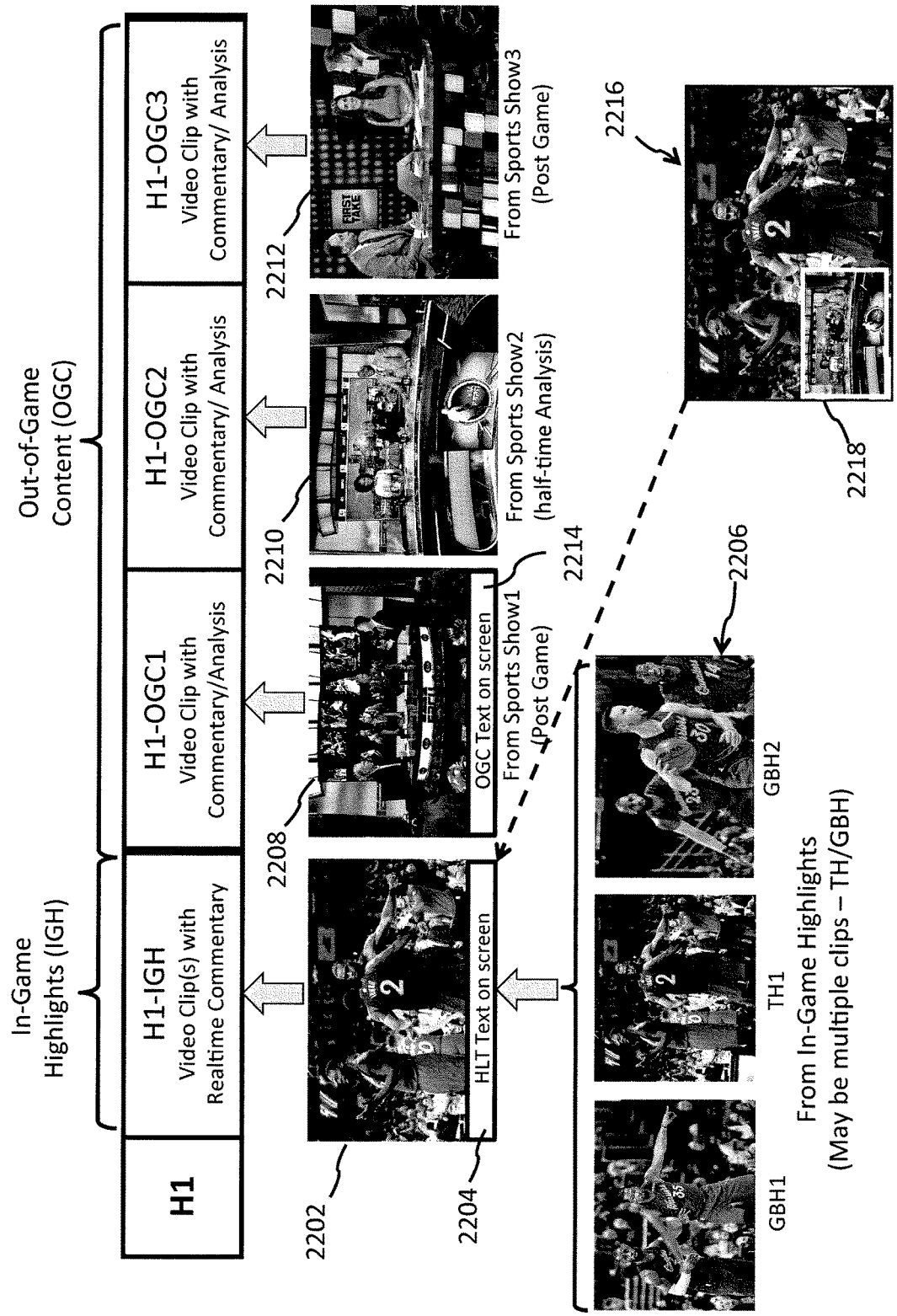
FIG. 22 is a diagram of video clips layout and a portion of the Final Highlights Table of FIG. 21, in accordance with embodiments of the present disclosure.
Figure 23:
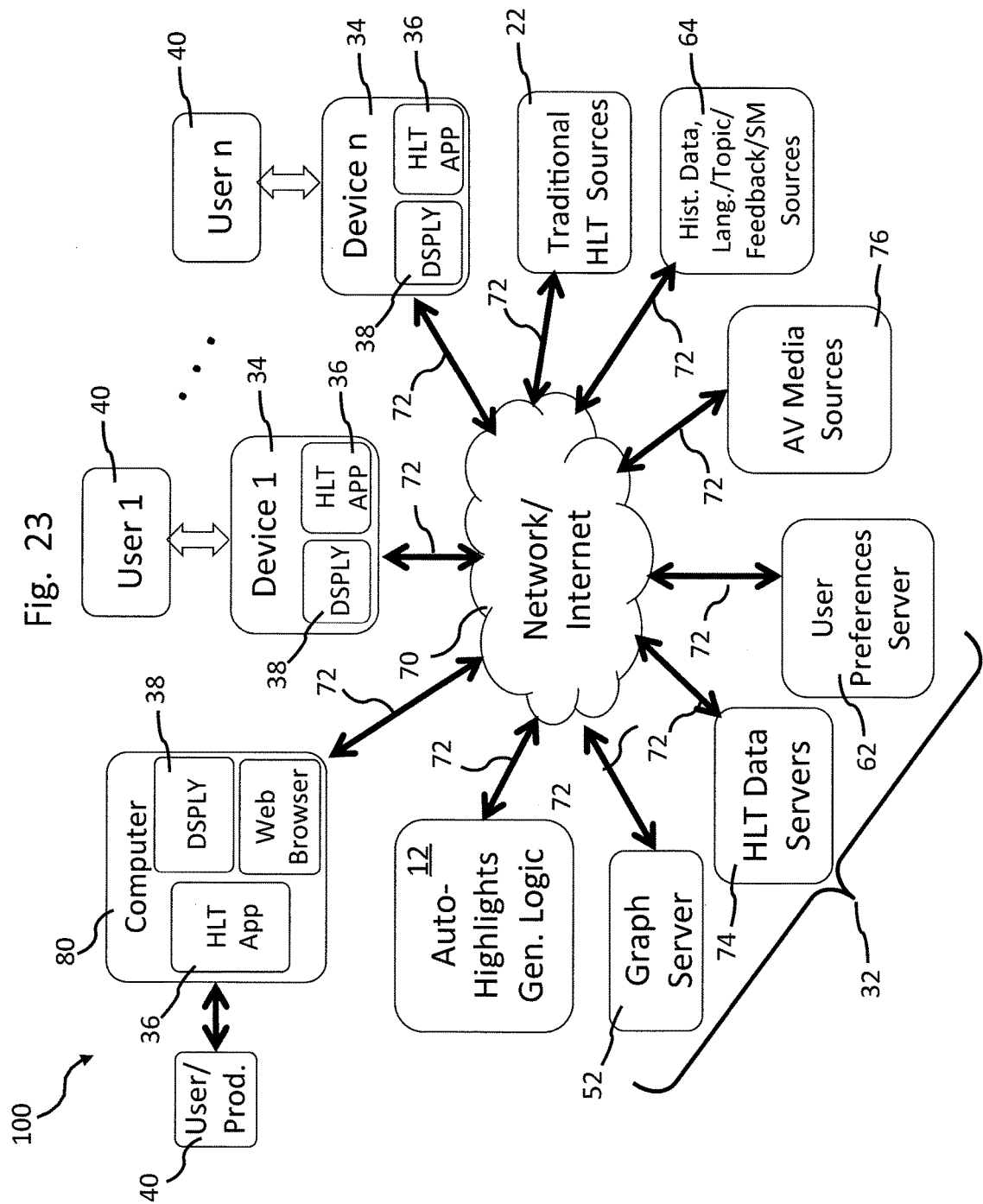
FIG. 23 is a diagram of a network environment, in accordance with embodiments of the present disclosure.

Referring to FIG. 19, a flow diagram 1900 illustrates one embodiment of a process or logic of the present disclosure for providing, among other things, a graphic user interface (GUI) or visualization to the user 40 on the display 38 of the user/communication device 34,80 (FIGS. 1,23), for receiving and displaying the AV highlight (HLT) content, and for allowing the user to set preferences, settings and the like, which may be implemented by the HLT App Software Logic 36 (FIGS. 1, 23). The process 1900 runs when the HLT App 36 is launched and begins at a block 1902, which retrieves data from the Final Highlight Server (or Final HLT Server) 60 (FIG. 1) the User Preferences Server 62, as well as input data from the user 40 via the user devices 34,80 (e.g., touch screen display, mouse, keyboard, audio microphone, video screen, or other user input interface). Next, a block 1904 displays the video and graphics (and GUI) for the HLT Content on the display 38 of the user device 34,80, as discussed hereinafter with FIGS. 21,22.

Next, a block 1906 checks if the "Settings" icon (e.g., gear image, not shown) has been selected on the screen. If YES, a block 1908 receives input settings data from the user 40, e.g., for display format, IG-HLT & OGC content, user attributes, as discussed hereinafter with FIG. 20. Next, a block 1910 saves (or updates) the settings info, based on the selections made by the user, e.g., on the device 34 or on the User Preferences Server 62 (FIG. 1), and the process exits. For example, some of the HLT App settings data, such as the IG-HLT & OGC Content settings and User Preferences Settings, may be stored in a table or database on the User Preferences Server 62, and other settings data may be stored locally on the User Device 34, such as the Display Format settings. Any other data storage arrangement that performs the functions of the present disclosure may be used if desired.

Figure 21:
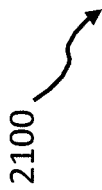
FIG. 21 is a diagram of a Final Highlights Table, in accordance with embodiments of the present disclosure.

Referring to FIGS. 21 and 22, the HLT App displays or streams the HLT Content from the Final HLT Server. Referring to FIG. 21, the Final Highlights Table 2100 is created as described herein above with the Stitching Logic of FIG. 18, where portions of the HLT Components Table are put into the Final Highlights Table 2100. In particular, the Final Highlights Table 2100 includes the In-Game Highlights (IGH) column having the In-Game Highlights discussed herein (including the In-Game HLT Components), e.g., H1-IGH to Hn-IGH, and the Related Out-of-Game Content (OGC) components, e.g., H1-OGC1 to H1-OGCn for the H1 highlight, H2-OGC1 to H2-OGCn for the H2 highlight, and a similar pattern for the rest of the highlights. In this case, the Related Out-of-Game Content (OGC) components, e.g., H1-OGC1, would correspond to the OGC Clips discussed herein above with FIG. 17, for all the desired (or selected) OGC shows. The user preferences (e.g., see Table 2000, FIG. 20 and related description) and the weighting factors, e.g., OGC Wts (FIG. 17), Play Wts (FIG. 9), as discussed herein, may determine the In-Game Highlights and Out-Of-Game Content that end up in the Final Highlights Table 2100.

Referring to FIG. 22, a sample visualization of the first highlight row H1 of the Final Highlight Table 2100 (FIG. 21) is shown, where the In-Game Highlight (H1-IGH) is a video clip 2202 with real-time commentary audio of the associated game highlight H1. The In-Game highlight video clip may also optionally have a lower text bar 2204 at the bottom of the video 2202 screen with text associated with the highlight H1 ("HLT Text on screen"), which may be used for captioning or other purposes. For example, a caption may be generated based on the outcome of the event, e.g., if it was unexpected, or if a selected highlight clip relates to something predicted in the pre-game commentary, or other event or game attribute. Other captions may be used or generated if desired to explain or add comments or insight into the video clips being shown based on information obtained from the analysis herein. In another example, the video clip 2202, may actually be multiple components or clips 2206 strung together, such as GBH1 (Graph-Based Hightlight1-Defensive play), TH1 (Traditional Highlight)-Technical Foul), GBH2 (Graph-Based Hightlight2-Offensive play), as discussed herein above with FIGS. 12 and 17. In that case, the multiple components may tell a story or a narrative regarding the highlight H1, which may be a key play that lead to the game outcome.

After the In-Game Highlights (IGH) are shown, the Out-of-Game Content (OGC) is provided to the viewer as shown in FIG. 22. In this example, there are three OGC clips (H1-OCG1, H1-OCG2, H1-OCG3), 2208,2210,2212, respectively, shown to the user that provide commentary or analysis associated with the In-Game Highlight H1-IGH and may launch playing directly after the In-Game Highlight ends to provide an uninterrupted viewer highlight experience. Any of the video clips 2208-2212 may have a section 2214 of the screen where text may be displayed ("OGC Text on screen"), which may be used for captioning or other purposes, if desired, as discussed above for the In-Game Highlights clip(s). The three OGC clips H1-OCG1, H1-OCG2, H1-OCG3, may be played in succession as shown in FIG. 22. In some embodiments, the user may opt-out of any given OGC clip while it is playing by touching the screen and then clicking on an "X" in the corner of the screen which may appear (not shown), or by swiping across the screen, which will cause the next clip in the sequence to start playing immediately. Also, in some embodiments, there may be a listing of all the OGC clips (e.g., on the side or bottom bar 2214 of the screen) and the user or viewer may select only the OGC clips they want to watch as part of the OGC content viewing experience.

In some embodiments, an OGC screen may be displayed in a smaller inlay window 2218 (e.g., picture-in-a-picture) on the larger screen 2216 where the In-Game Highlight (IGH) is playing. In that case, the user may switch between the In-Game Highlight video clip(s) and the OGC clip(s), by touching or clicking on the smaller inlay window 2218, which swap places with the larger screen window 2216. In that case, relevant segmented post-game commentary may be included as inlays to relevant game footage. For example, if significant post-game commentary discusses turnovers, the AV media associated with significant highlight footage with turnovers, may be displayed on the inlay screen 2216, which may be identified from the data-graph structures described herein or from play-by-play data from game metadata. In some embodiments, the relevant, segmented post-game commentary (OGC) may be appended to the back of the highlight reel, or stored on another database/table, or at the bottom of the Table 2100 (in separate rows from the In-Game highlights), with flags or pointers to the associated in-game highlights.

Referring to FIG. 20, on the display screen 38 of the user device 34,80 there may be a user settings menu option displayed (not shown), which, when selected (as described above with FIG. 19), allows the user to select various attributes and features associated with the HLT App software 36, to perform the functions described herein, such as various display options, defaults, and the like, as well as to provide information about the user (user attributes), or for other purposes as described hereinafter. In particular, referring to FIG. 20, when the Settings option is selected, a GUI pop-up menu 2000 may appear on the display 38 (FIGS. 1, 23), having a series of options or user settings to select.

More specifically, the user settings are shown in three sections, a display format section 2002, an HLT & OGC Content section 2004, and a User Attributes/Characteristics settings section 2006. In the display format section 2002, checkboxes are provided to indicate how certain display items should be displayed by the App on the screen, such as whether to show the In-Game Highlights (IG-HLT) and the OGC sequentially or in picture in picture format. There may also be options to select screen locations for the text (e.g., top, bottom, left, right) and the type of IG-HLT to show, e.g., Traditional & Graph-Based, Graph-Based only, or Traditional Only. Other display format settings may be provided if desired, or as needed or discussed herein, to perform the functions of the present disclosure.

The IG-HLT & OGC Content section 2004 allows the user to select various aspects of the highlight content, such as the maximum number of OGC clips per highlight, and the OGC segment time length (e.g. 30 sec. or other selectable times). Whether to use OGC sources after game ends for In-Game Highlight identification or analysis or priority. The length of sample time for the OGC content after the game ends. The option to exclude certain OGC sports shows, OGC commentators, or OGC show types from the OGC portion of the highlights. Other IG-HLT & OGC Content options may be provided if desired. The settings may also set the logic to use only the highest weighted (or most relevant or significant) components, e.g., OGC Wt or Play Wt. Also, any of the factors, times, windows, settings, weightings (or weighting factors), default values, thresholds, limits, priorities, sequencing, rules, formats, tags, features, sizes, and adjustments discussed herein may also be located in the HLT App settings. Any other IG-HLT & OGC Content settings may be used if desired.

The User Attributes section 2006 allows the user to provide information about himself/herself, which may be saved in a table or database in the User Preferences Server 62 (FIG. 1) for use in determining user type. In particular, the User Attributes section 2006 also has fields or checkboxes for type of user, e.g., a producer of a TV show, or a general app user. If the user is a TV or sports show producer, the producer (HLT Producer) may want to define or adjust the setting(s) for the In-Game Highlights and OGC content for a broadcast TV or on-line internet-based audience. The User Attributes section 2006 also has fields or checkboxes or corresponding (single or multi-pick) drop-down menus for: age group, home address/location, and may have other demographic information such as male/female, date of birth and the like. This information may be used by the adjustment logic to determine the likes and dislikes of the audience and learn how to select the type of highlight experience that best suits the viewer, e.g., select the order of highlight components, target geographic areas or demographic groups with certain highlight contents, and for the Adjustment Logic 48 to make adjustments to the highlight logic based on feedback from social media or directly from users/producers. Other settings and preferences may be used if desired, or as needed or discussed herein, to perform the functions of the present disclosure.

Referring to FIG. 23, the present disclosure may be implemented in a network environment 100. In particular, various components of an embodiment of the system of the present disclosure include a plurality of computer-based user devices 34 (e.g., Device 1 to Device N), 80, which may include a desk-top or laptop or tablet computer 80, each of which may interact with respective users (User 1 to User N). In some embodiments, the user 40 may be a HLT Producer of the highlight video (or AV media content or data) and may use a desk-top or laptop or tablet computer 80, having the HLT App 36, the Display 38, and a web browser (as needed) to upload the HLT components or tables or preferences discussed herein and to review the Final HLT Highlight AV media/video content and make adjustments as needed for a broadcast viewing audience, as discussed herein. A given user may be associated with one or more of the devices 34,80. In some embodiments, the HLT App 36 may reside on a remote server and communicate with the user device(s) 34 via the network. In particular, one or more of the user devices 34, may be connected to or communicate with each other through a communications network 70, such as a local area network (LAN), wide area network (WAN), virtual private network (VPN), peer-to-peer network, or the internet, wired or wireless, as indicated by lines 62, by sending and receiving digital data over the communications network 70. If the user devices 34 are connected via a local or private or secured network, the devices 34 may have a separate network connection to the internet for use by web browsers running on the devices 34. The devices 34,80 may also each have a web browser to connect to or communicate with the internet to obtain desired content in a standard client-server based configuration to obtain the HLT App 36 or other needed files to execute the logic of the present disclosure. The devices may also have local digital storage located in the device itself (or connected directly thereto, such as an external USB connected hard drive, thumb drive or the like) for storing data, images, audio/video, documents, and the like, which may be accessed by the HLT App 36 running on the user devices 34.

Also, the computer-based user devices 34,80 may also communicate with separate computer servers via the network 70 such as the Graph Server 52, HLT Data Servers 74 (which may include the Highlight Component Server 54, the Highlight Rules Server 50, and the Final Highlight Server 60), and the User Preferences (or attributes) Server 62. The servers 52,74,62 (referred to generally herein as Servers 32 (FIG. 1)) may be any type of computer server with the necessary software or hardware (including storage capability) for performing the functions described herein. Also, the servers 32 (or the functions performed thereby) may be located, individually or collectively, in a separate server on the network 70, or may be located, in whole or in part, within one (or more) of the User Devices 34 on the network 70. In addition, the AV Media Sources 76, the Historical Data and Language/Topic and Feedback/SM Data Sources 64, and the Traditional HLT Sources 22, as well as the Servers 32, may each communicate via the network 70 with the Auto-Highlight Gen. Logic 12, and with each other or any other network-enabled devices or logics as needed, to provide the functions described herein. Similarly, the User Devices 34 may each also communicate via the network 70 with the Servers 24,26,28 and the Auto-Highlight Gen. Logic 12, and any other network-enabled devices or logics necessary to perform the functions described herein.

Portions of the present disclosure shown herein as being implemented outside the user device 34,80 may be implemented within the user device 34 by adding software or logic to the user devices, such as adding logic to the HLT App software 36 or installing a new/additional application software, firmware or hardware to perform some of the functions described herein, such as some or all of the Auto-Highlight Gen. Logic 12, or other functions, logics, or processes described herein. Similarly, some or all of the Auto-Highlight Gen. Logic 12 of the present disclosure may be implemented by software in one or more of the Servers 32, to perform the functions described herein, such as some or all of the Auto-Highlight Gen. Logic 12, or some or all of the functions performed by the HLT App software 36 in the user device 34,80.

The system, computers, servers, devices and the like described herein have the necessary electronics, computer processing power, interfaces, memory, hardware, software, firmware, logic/state machines, databases, microprocessors, communication links, displays or other visual or audio user interfaces, printing devices, and any other input/output interfaces, to provide the functions or achieve the results described herein. Except as otherwise explicitly or implicitly indicated herein, process or method steps described herein may be implemented within software modules (or computer programs) executed on one or more general-purpose computers. Specially designed hardware may alternatively be used to perform certain operations. Accordingly, any of the methods described herein may be performed by hardware, software, or any combination of these approaches. In addition, a computer-readable storage medium may store thereon instructions that when executed by a machine (such as a computer) result in performance according to any of the embodiments described herein.

In addition, computers or computer-based devices (or user devices 34,80) described herein may include any number of computing devices capable of performing the functions described herein, including but not limited to: tablets, laptop computers, desktop computers, smartphones, mobile communication devices, smart TVs, set-top boxes, e-readers/players, and the like.

Although the disclosure has been described herein using exemplary techniques, algorithms, or processes for implementing the present disclosure, it should be understood by those skilled in the art that other techniques, algorithms and processes or other combinations and sequences of the techniques, algorithms and processes described herein may be used or performed that achieve the same function(s) and result(s) described herein and which are included within the scope of the present disclosure.

Any process descriptions, steps, or blocks in process or logic flow diagrams provided herein indicate one potential implementation, do not imply a fixed order, and alternate implementations are included within the scope of the preferred embodiments of the systems and methods described herein in which functions or steps may be deleted or performed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale, unless indicated otherwise.

Conditional language, such as, among others, "can," "could," "might," or "may," unless specifically stated otherwise, or otherwise understood within the context as used, is generally intended to convey that certain embodiments could include, but do not require, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A method for automatically generating a narrative based highlights video of a sporting event, comprising:
   receiving AV media data indicative of the sporting event;
   identifying at least one in-game highlight within the AV media data using a data-graph technique as selected in-game highlight, the data-graph technique being performed by a computer other than a user device;
   wherein the data-graph technique uses locations and actions of the players and possession during the sporting event, and wherein the locations and actions and possession are represented by data indicative of nodes and edges of a data graph;
   identifying out-of-game content related to the selected in-game highlight as selected out-of-game content; and
   combining the selected in-game highlight with the selected out-of-game content to create the narrative-based sports highlight video.

2. The method of claim 1, wherein the graph-based technique comprises generating dynamic data graphs for plays in the sporting event.

3. The method of claim 1, wherein the graph-based technique comprises identifying frequent sub-graphs for plays in the sporting event.

4. The method of claim 1, wherein the graph-based technique comprises identifying dynamic normative patterns for the sporting event.

5. The method of claim 3, wherein the graph-based technique further comprises identifying dynamic normative patterns for the sporting event from the frequent sub-graphs.

6. The method of claim 4, wherein the graph-based technique further comprises identifying dynamic normative patterns for the current sporting event closest to dynamic normative patterns of other sporting events with the same outcome.

7. The method of claim 1, wherein the identifying out-of-game content comprises creating out-of-game content AV clips based on topic.

8. The method of claim 7, wherein the creating the clips comprises segmenting AV content of out-of-game sports shows into segments of a predetermined length, analyzing the topic of each segment sequentially, and identifying the segment when a topic change occurs.

9. The method of claim 1, wherein the identifying further comprises creating an in-game highlight video having an AV clip of at least one highlight selected using the graph-based technique and an AV clip that is a traditional highlight.

10. The method of claim 1 wherein at least one play in the selected in-game highlight is weighted by at least one of pre-game commentary and historical data regarding the teams in the sporting event.

11. The method of claim 1, wherein the identifying at least one in-game highlight, the identifying out-of-game content, and the combining are adjusted based on at least one of feedback data and user preferences.

12. The method of claim 1, wherein the combining is based on at least one of rules, weightings and preferences.

13. The method of claim 1, wherein identifying at least one in-game highlight, the identifying out-of-game content, and the combining are based on weighting factors.

14. The method of claim 13, wherein the weighting factors comprises at least one of play weighting factors and out-of-game content (OGC) weighting factors.

15. The method of claim 14, wherein a value of the weighting factor is based on events that happen after a "point of no return" in the sporting event.

16. A method for automatically generating a highlights video of a sporting event, comprising:
   receiving AV media data indicative of the sporting event;
   identifying at least one in-game highlight within the AV media data using a data-graph technique as selected in-game highlight, the data-graph technique being performed by a computer other than a user device;
   wherein the data-graph technique uses locations and actions of the players and possession during the sporting event, and wherein the locations and actions and possession are represented by data indicative of nodes and edges of a data graph;
   wherein the graph-based technique comprises identifying at least one dynamic normative pattern for the sporting event; and
   providing the sports highlight video using the selected in-game highlight.

17. The method of claim 16, wherein the graph-based technique further comprises identifying frequent sub-graphs for plays in the sporting event, and wherein the dynamic normative pattern is identified from the frequent sub-graphs.

18. The method of claim 16, wherein the at least one dynamic normative pattern is related to the outcome of the sports event.

19. The method of claim 16, further comprising identifying out-of-game content related to the selected in-game highlight as selected out-of-game content; and combining the selected in-game highlight with the selected out-of-game content to create the sports highlight video.

20. A method for automatically generating a narrative based highlights video of a sports event, comprising:
   receiving AV media data indicative of the sporting event;
   identifying at least two in-game highlights within the AV media data, a first in-game highlight using a traditional in-game highlight, and a second in-game highlight using a data graph technique, as selected in-game highlights, the data-graph technique being performed by a computer other than a user device;
   wherein the data-graph technique uses locations and actions of the players and possession during the sporting event, and wherein the locations and actions and possession are represented by data indicative of nodes and edges of a data graph;
   identifying out-of-game content related to the selected in-game highlight as selected out-of-game content; and combining the selected in-game highlights with the out-of-game content to create the narrative-based sports highlight video.

21. The method of claim 20, wherein the identifying out-of-game content comprises creating out-of-game content AV clips based on topic.

22. The method of claim 20, wherein the creating the clips, comprises segmenting AV content of out-of-game sports shows into segments of a predetermined length, analyzing each segment sequentially, and identifying when a topic change occurs by marking the segment.

23. The method of claim 20, wherein the combining is based on at least one of rules, weightings and preferences.

24. The method of claim 20, wherein at least one of the out-of-game content shows, commentators, number of clips, and types, are selectable to be part of the highlights video.

25. The method of claim 1, wherein the nodes are indicative of player locations and possession and the edges are indicative of player actions.

26. The method of claim 16, wherein the nodes are indicative of player locations and possession and the edges are indicative of player actions.

27. The method of claim 1, further comprising receiving out-of-game AV media data and the identifying comprises identifying, from the out-of-game AV media data, out-of-game content related to the selected in-game highlight as the selected out-of-game content.

28. The method of claim 20, further comprising receiving out-of-game AV media data and the identifying comprises identifying, from the out-of-game AV media data, out-of-game content related to the selected in-game highlight as the selected out-of-game content.

\* \* \* \* \*